United States Patent [19]
Seki et al.

[11] Patent Number: 5,771,224
[45] Date of Patent: Jun. 23, 1998

[54] ORTHOGONAL FREQUENCY DIVISION MULTIPLEXING TRANSMISSION SYSTEM AND TRANSMITTER AND RECEIVER THEREFOR

[75] Inventors: Takashi Seki; Noboru Taga; Shigeru Okita; Tatsuya Ishikawa, all of Yokohama, Japan

[73] Assignee: Kabushiki Kaisha Toshiba, Kawasaki, Japan

[21] Appl. No.: 619,211

[22] Filed: Mar. 21, 1996

[30] Foreign Application Priority Data

Mar. 23, 1995 [JP] Japan .................................. 7-063869

[51] Int. Cl.[6] ............................. H04L 27/26; H04L 27/34
[52] U.S. Cl. .......................... 370/206; 370/482; 375/264; 375/266; 375/269; 375/308; 375/331
[58] Field of Search ..................................... 370/203, 206, 370/210, 480, 482, 484, 204, 535; 375/260, 261, 264, 266, 279, 280, 285, 296, 298, 308, 267, 268, 269, 281, 324, 329, 331, 340, 344

[56] References Cited

U.S. PATENT DOCUMENTS

| 5,406,551 | 4/1995 | Saito et al. | 370/203 |
|---|---|---|---|
| 5,416,767 | 5/1995 | Koppelaar et al. | 370/210 |
| 5,521,943 | 5/1996 | Dambacher | 375/295 |
| 5,602,835 | 2/1997 | Seki et al. | 370/206 |
| 5,608,764 | 3/1997 | Sugita et al. | 375/344 |
| 5,617,411 | 4/1997 | Mueller | 370/210 |

OTHER PUBLICATIONS

Saito, et al: "A Digital Modulation Method for Terrestrial Digital Broadcasting Systems Using a Trellis Coded OFDM under Multipath Conditions", The Journal of ITE, vol. 47, No. 10, pp. 1374–1382 (1993).

Hara, et al: "System Performance of Multicarrier Modulation in Fading Channels", ITE Technical Report, vol. 18, No. 11, pp. 39–44 (Feb. 1994 ).

Trip Report and Recommendation Regarding COFDM, submitted by the Task Force on COFDM of the Transmission Expert Group, Jan. 1994.

Nogami, et al: "A Frequency and timing Period Acquistion Technique for OFDM Systems", IEEE (1995) pp. 1010–1015.

*Primary Examiner*—Alphus H. Hsu
*Attorney, Agent, or Firm*—Cushman Darby & Cushman IP Group of Pillsbury Madison & Sutro LLP

[57] ABSTRACT

A transmission system is disclosed which permits the receiving end to demodulate multi-valued modulated symbols successfully under fading conditions and reduces the amount of transmitted reference data to improve data transmission efficiency. At the transmitting end, a multiplexing section, a modulating section, and a transmitting section are provided. In transmitting an OFDM transmission frame, null symbols and reference symbols are placed in the beginning portion of the frame and QPSK symbols are placed in an information symbol data region in the frame with equal spacings in time and frequency. At the receiving end, a receiving section, a demodulation section, an equalizing section, and a demultiplexing section are provided. An error detector detects amplitude and phase errors of each carrier from the reference symbols, and a variation detector detects variations in the amplitude and phase of a received signal from the QPSK symbols. The carrier amplitude and phase errors are corrected by a correction information producing section on the amplitude and phase variations of the received signal detected by the variation detector to produce correction information. The equalizing section equalizes the demodulated symbol data according to the correction information.

13 Claims, 16 Drawing Sheets

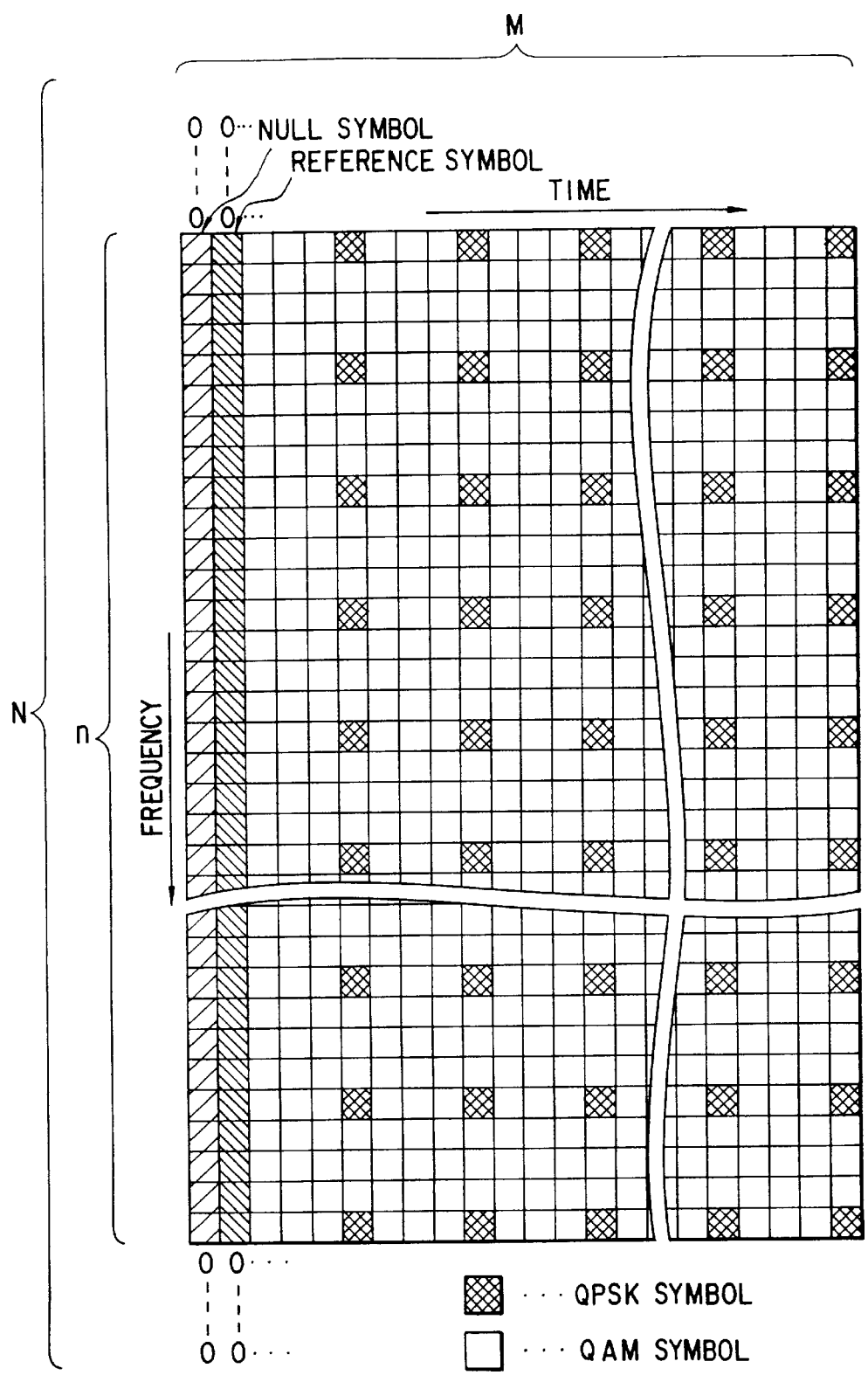
F I G. 2

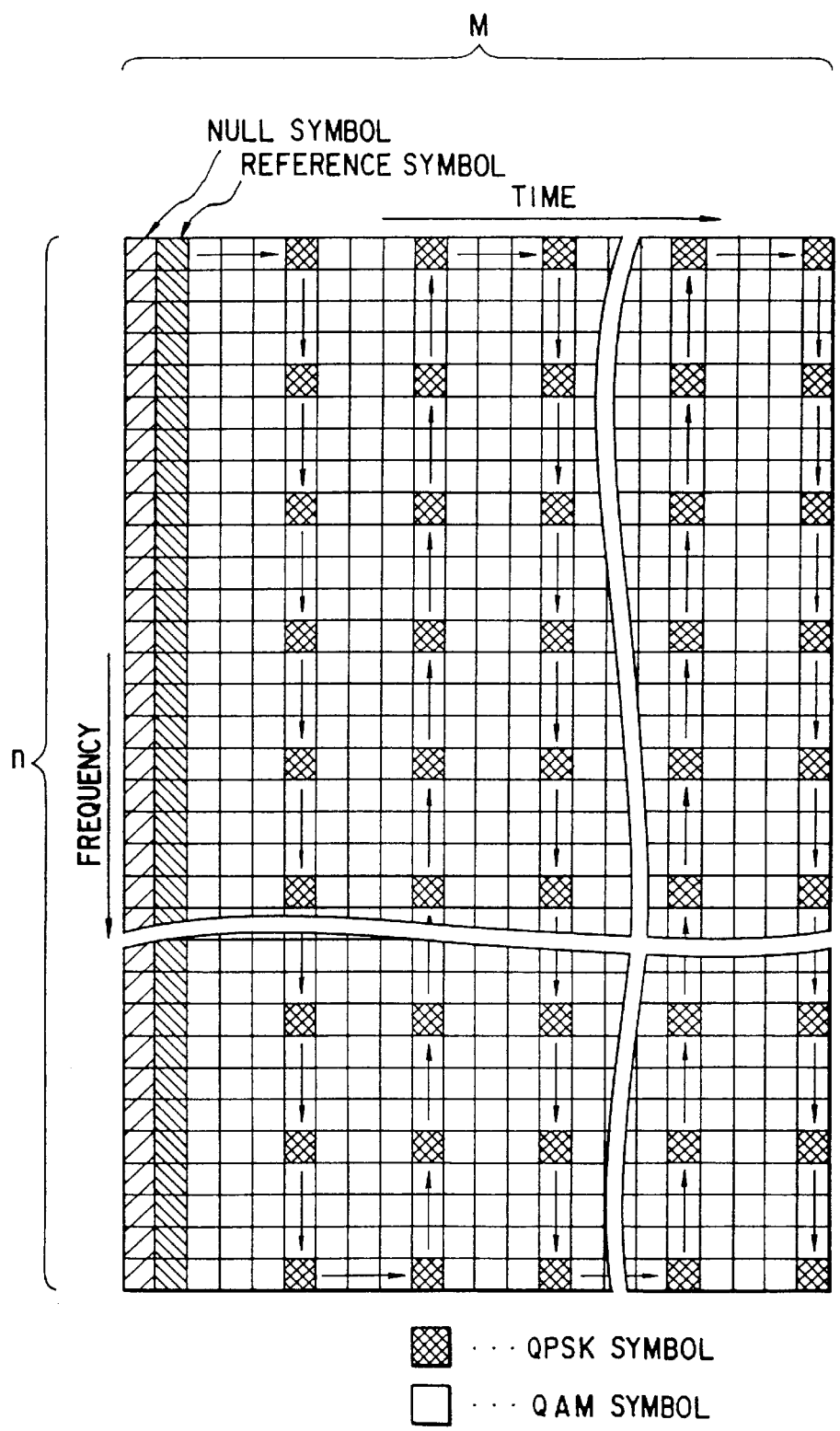
F I G. 7

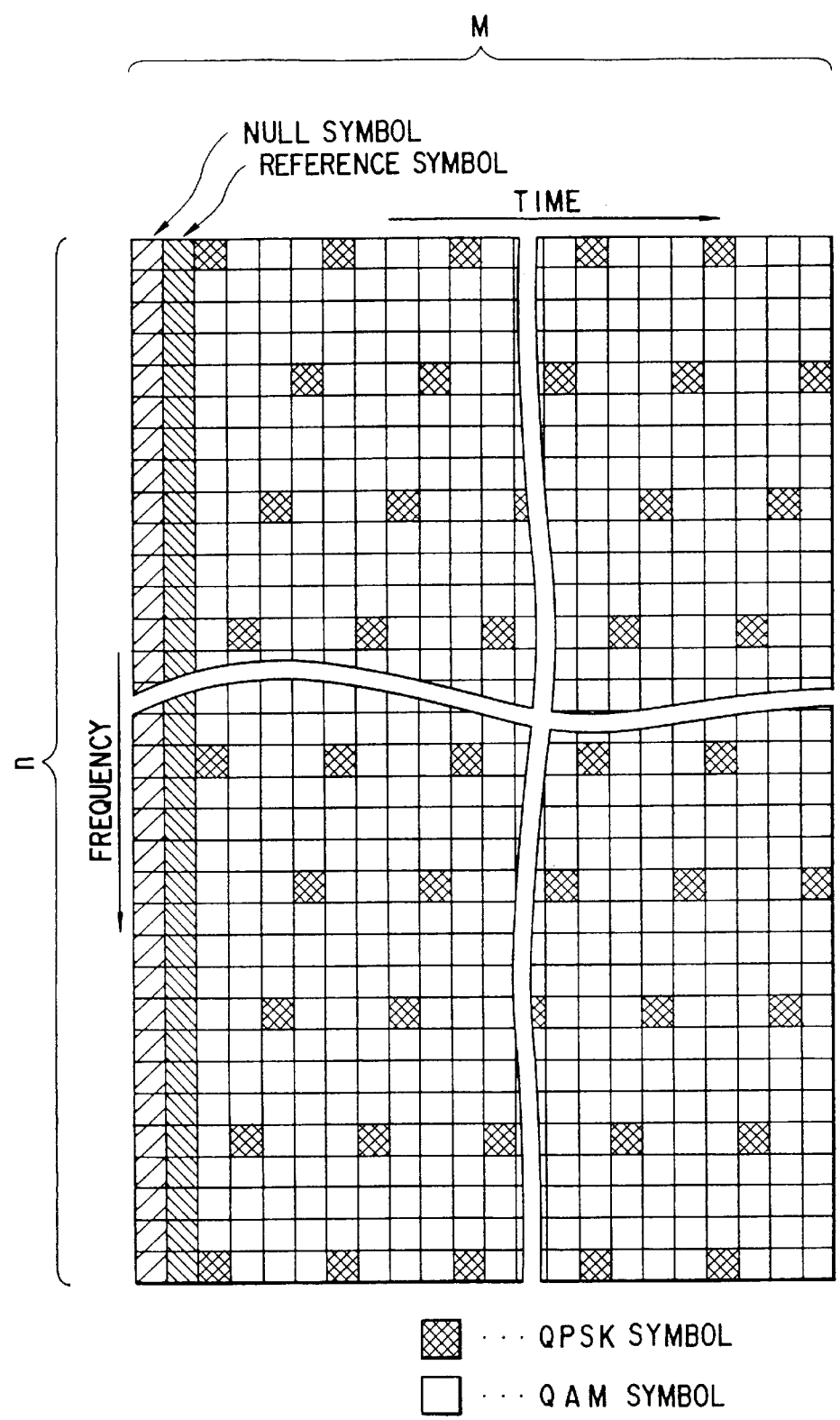
F I G. 12

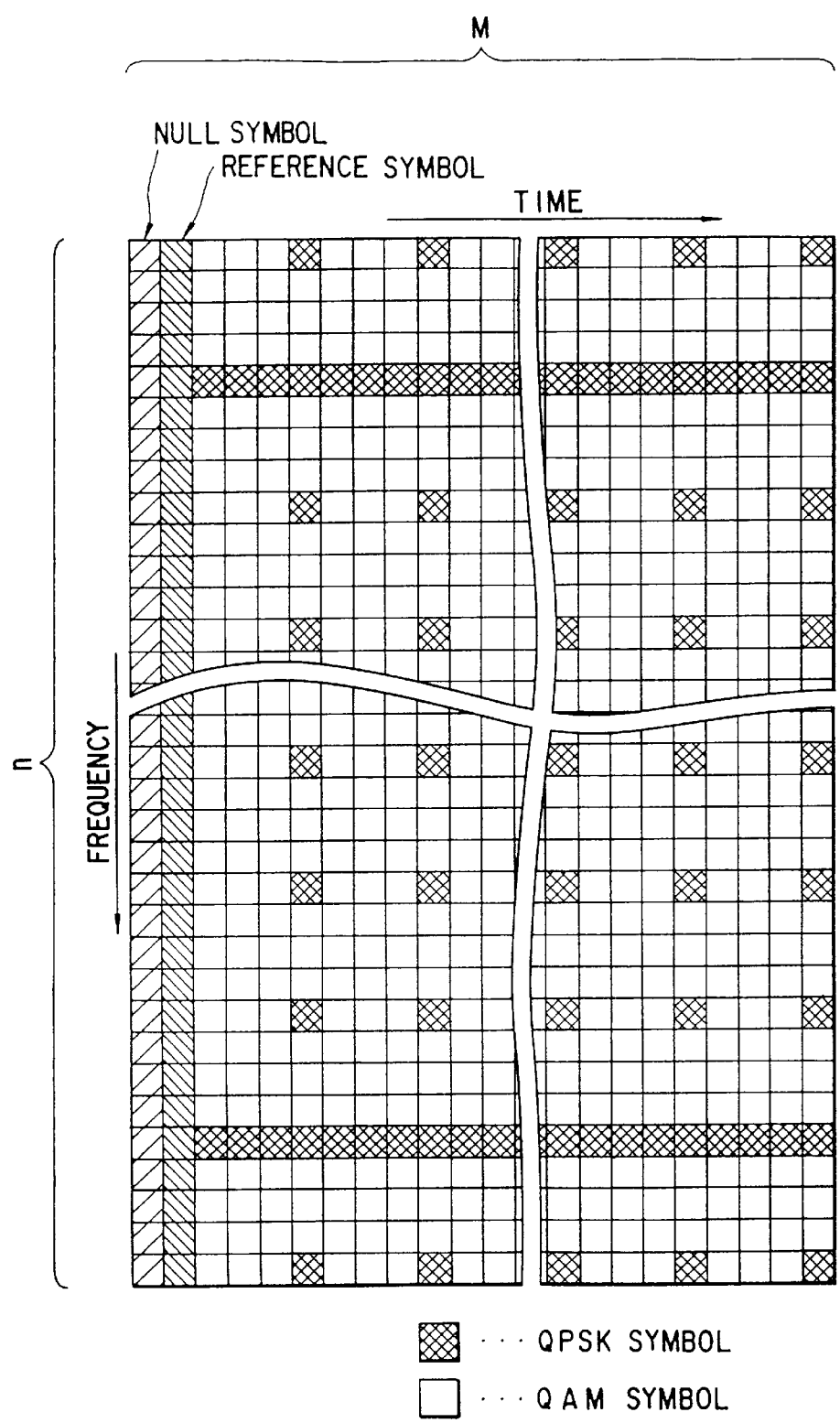
F I G. 14

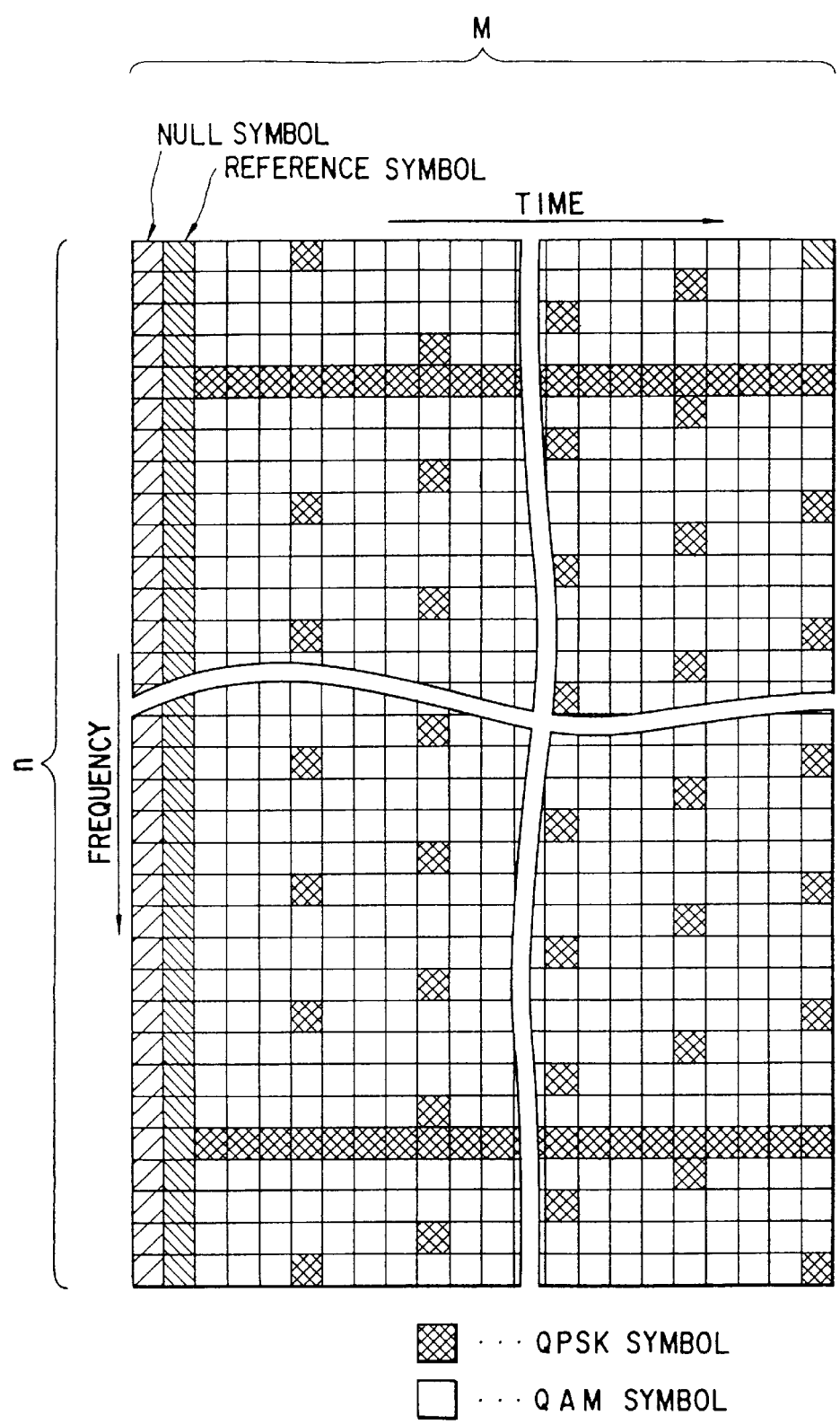
F I G. 15

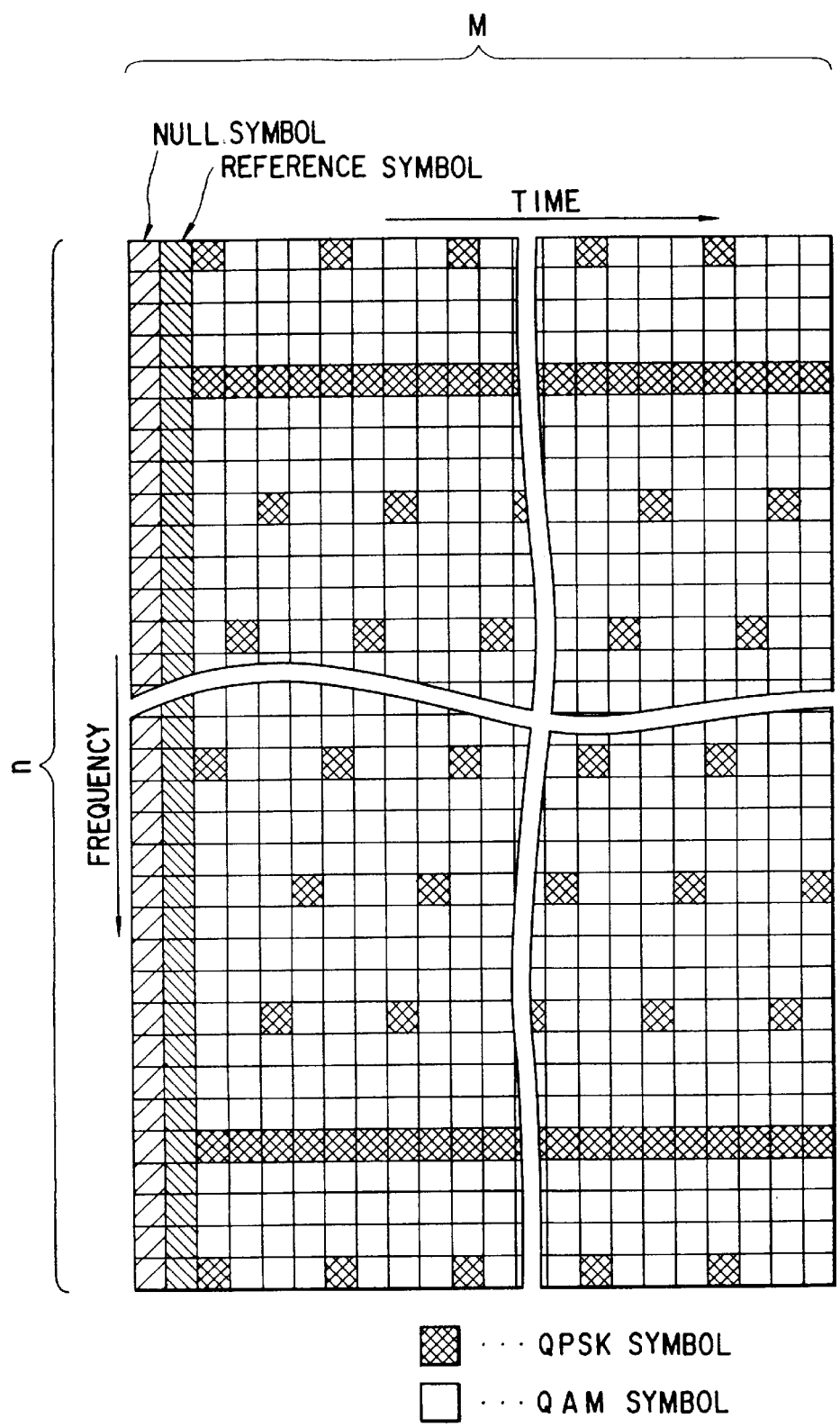
F I G. 16

ORTHOGONAL FREQUENCY DIVISION MULTIPLEXING TRANSMISSION SYSTEM AND TRANSMITTER AND RECEIVER THEREFOR

BACKGROUND OF THE INVENTION

1. Field of the Invention

The invention relates to a radio communication system employing an orthogonal frequency division multiplexing technique, and more specifically to an orthogonal frequency division multiplexing transmission system suitable for use with a mobile communication system and a transmitter and a receiver therefor.

2. Description of the Related Art

In recent years, digital modulation systems have been developed actively in the field of audio and video transmission. In digital terrestrial broadcasting, attention is paid, among others, to orthogonal frequency division multiplexing (hereinafter abbreviated to OFDM) modulation systems which are robust to multipath interference and have a high frequency usage rate. In the OFDM modulation system, a large number of carriers (several hundreds to several thousands) which are orthogonal to one another are each modulated with digital data to be transmitted.

With digital audio broadcasting using the OFDM modulation, each carrier is modulated by the differential QPSK method. In the differential QPSK method, data is made for transmission to correspond to a phase difference between symbols. At the receiving end, data can be demodulated by the (differential detection). Thus, there is an advantage in that a demodulator used is simple in construction as compared to that for the coherent detection system.

In addition, the differential QPSK method is also suitable for a mobile communication system. In a mobile-communication receiver, variations in envelope and phase of the received signal will occur due to fading channels. In the differential QPSK system, however, since data is demodulated from a phase difference between symbols, stable data reception can be achieved without being affected by variations in the received signal due to fading.

On the other hand, the use of the OFDM modulation system for digital television broadcasting needs a high transmission rate. In order to increase the transmission rate, the use of a multi-valued modulation method for each carrier is required. With digital television broadcasting using the OFDM modulation system, a multi-valued QAM method is used as a modulation method for each carrier. With the multi-valued QAM system, however, unlike the above-described differential QPSK method, it is impossible to transmit data in the form of a phase difference between symbols and, at the receiving end, to demodulate data by the differential detection. In order to demodulate multi-valued QAM demodulated signals, seeking the amplitude and phase of each carrier at the receiving end is required.

For the multi-valued QAM system, therefore, a method has been proposed by which, at the transmitting end, reference symbols whose amplitude and phase are already known are transmitted periodically and, at the receiving end, the reference symbols are used as the reference amplitude and phase in demodulating multi-valued QAM symbols.

However, the conventional OFDM transmission system described above has a problem that the transmission of reference data decreases the data transmission efficiency.

SUMMARY OF THE INVENTION

Accordingly an object of the invention is to provide an orthogonal frequency division multiplexing transmission system, suitable for a mobile communication system and the like, which permits multi-valued modulated symbols to be demodulated successfully at the receiving end, even in fading environments, and permits the amount of transmitted reference data to be reduced for increasing data transmission efficiency, and a transmitter and a receiver therefor.

To achieve the object, an orthogonal frequency division multiplexing transmission system of the invention is characterized in that, at the transmitting end, a transmission frame is configured such that a plurality of slots are arranged two-dimensionally along time and frequency axes, reference symbols are inserted into predetermined restricted slots in the transmission frame, and PSK information symbols subjected to at least PSK modulation and information symbols subjected to digital modulation with a higher multi-value level than the PSK modulation are inserted into the other slots in a selected positional relation with respect to each other. At the receiving end, variations in amplitude and phase of a received signal are detected from the PSK information symbols in the transmission frame, the reference symbols in the transmission frame are corrected according to the detected variations in amplitude and phase of the received signal, and the information symbols received are demodulated according to the corrected reference symbols.

The orthogonal frequency division multiplexing transmission system of the invention is further characterized by the use of the following systems for transmitting the PSK information symbols.

According to a first transmission system, the PSK information symbols are inserted into predetermined slots of the transmission frame which are equally spaced in time and frequency.

In a second transmission system, the PSK information symbols are inserted into slots which are equally spaced along the time axis but are varied with time along the frequency axis.

In a third transmission system, the PSK information symbols are inserted into slots which are equally spaced along the frequency axis but are varied with frequency along the time axis.

In a fourth transmission system, the PSK information symbols are transmitted continuously in time at predetermined frequencies.

In a fifth transmission system, the PSK information symbols are subjected to differential coding using the reference symbols as the basis for the differential coding.

In a transmitter of the invention, a multiplexing means configures a transmission frame in which a plurality of slots are arranged two-dimensionally along time and frequency axes. Reference symbols are inserted into restricted, simultaneous slots in the transmission frame. PSK information symbols subjected to PSK modulation and information symbols subjected to digital modulation with a higher multi-value level than said PSK modulation are inserted into the other slots in a predetermined positional relation with respect to each other. The reference symbols, the PSK information symbols and the information symbols are multiplexed together in this manner, thereby forming the transmission frame. The transmission frame is subjected to orthogonal frequency division multiplexing modulation by the orthogonal frequency division multiplexing modulation means, then subjected to quadrature modulation for transmission.

The transmitter further comprises a differential coding means between the multiplexing means and the orthogonal frequency division multiplexing modulation means, which provides differential coding to the PSK information symbols in the transmission frame.

A receiver of the invention includes an error detecting means for detecting amplitude and phase errors of the carriers from the reference symbols in an orthogonal frequency division multiplexing demodulated signal, a variation detecting means for detecting variations in amplitude and phase of a received signal from the PSK symbols in the demodulated signal, a correcting information producing means responsive to the error detecting means and the variation detecting means for producing correcting information, and an equalizing means for equalizing the amplitude and phase of the information symbols in the demodulated signal according to the correcting information.

In the receiver of the invention, the variation detecting means further includes a means for detecting amplitude and phase variations of the received signal from the PSK information symbols in the demodulated signal and an interpolation means responsive to the detecting means for interpolating amplitude and phase variations in the region into which only the information symbols other than the PSK information symbols are inserted.

The receiver of the invention further includes a frequency control means for controlling the frequency of a regenerative carrier used for quadrature demodulation. In this frequency control means, the phase variations detected by the variation detecting means are averaged to produce a frequency control signal, which is applied to the quadrature demodulation means to control the frequency of the regenerative carrier.

Moreover, a receiver of the invention, for use with a transmission system for transmitting a transmission frame in which a plurality of PSK information symbols are inserted intermittently into an information symbol inserting region and the PSK information symbols are subjected to differential coding from a transmitter to the receiver in the form of an orthogonal frequency division multiplexing modulated signal, comprises a receiving means for receiving and quadrature demodulating the orthogonal frequency division multiplexing modulated signal, an orthogonal frequency division multiplexing demodulation means for orthogonal frequency division multiplexing demodulating a quadrature demodulated signal output from the receiving means, and a differential detection means for demodulating the PSK information symbols in the demodulated signal output from the orthogonal frequency division multiplexing demodulation means by means of differential detection.

The receiver further comprises frequency variation detecting means for detecting variations in frequency of a received signal from the PSK information symbols demodulated by the differential detecting means and a frequency control means for averaging frequency variations detected by the frequency variation detecting means to produce a frequency control signal, which is applied to quadrature demodulation means of the receiving means to control the frequency of a regenerative carrier.

According to the above-described orthogonal frequency division multiplexing transmission system of the invention, at the receiving end, variations in amplitude and phase of a received signal are detected from the PSK information symbols, amplitude and phase errors of carriers detected from the reference symbols are corrected accordingly, and demodulated symbol data is equalized according to the corrected amplitude and phase errors. Therefore, amplitude and phase variations of the demodulated symbols due to fading can be equalized surely to reproduce the information symbols correctly without inserting any reference symbols into the information symbol region of the transmission frame. This permits all of the information symbol region of the transmission frame to be used for information transmission, thereby increasing the information transmission efficiency.

The use of the system of the invention allows high-quality, high-efficiency information transmission to be implemented even in the case of the use of fading channels as in mobile communication systems.

If, in transmitting the PSK information symbols and the information symbols, the PSK information symbols are inserted into predetermined slots which are equally spaced in time and space, then multiplexing control of the PSK information symbols will be performed easily.

If the PSK information symbols are inserted into slots which are equally spaced along the time axis but are varied with time along the frequency axis, then the PSK information symbols will be transmitted in all the carriers although the number of PSK information symbols per carrier is decreased. Thus, variations in a channel can be detected effectively in the case where the variations are small in time but large in frequency.

In contrast, if the PSK information symbols are transmitted inserted into slots which are equally spaced along the frequency axis but are varied with frequency along the time axis, then the PSK information symbols are transmitted in all of the time slots although the number of PSK information symbols per time slot are decreased. Thus, variations in a channel can be detected effectively in the case where the variations are small in frequency but large in time.

If the PSK information symbols are transmitted continuously in time in a predetermined time slot, then changes of the PSK information symbols with time at the receiving end can be detected continuously at a predetermined carrier. For this reason, variations in a channel can be detected correctly as compared with the case where the PSK information symbols are transmitted intermittently at all the carriers. If there is a phase error of a regenerative carrier at the receiving end, a phase rotation will occur in the demodulated output when viewed at a fixed carrier along the time axis. Thus, by transmitting the PSK information symbols by a predetermined carrier continuously, the frequency error of the regenerative carrier can be detected more correctly.

By transmitting the PSK information symbols in differential coded form using the reference symbols as the reference for differential coding, a differential detector can be used at the receiving end to demodulate the PSK information symbols. This allows the receiver to be simple in construction. The differential PSK system is robust to fading, allowing more stable data demodulation at the receiving end.

According to the above-described transmitter of the invention, the multiplexing means can be used to form and transmit an OFDM frame in which reference symbols and information symbols including at least PSK symbols are placed properly in the slots.

In addition, the differential coding of the PSK symbols permits the symbols to be demodulated by means of differential detection. Thus, the receiver can be made simple in construction.

Moreover, according to the above-described receiver of the invention, variations in amplitude and phase of a received signal are detected from the PSK symbols inserted into the information symbol region of the received transmission frame, amplitude and phase errors of each carrier detected from the reference symbols are corrected according to the detected variations in amplitude and phase, and then the demodulated symbols are equalized. For this reason, amplitude and phase variations due to fading can be corrected accurately even if a large number of reference symbols are not inserted into the transmission frame.

Furthermore, according to the receiver of the invention, variations in amplitude and phase of a received signal are detected from the PSK symbols inserted intermittently into a demodulated signal, and variations in amplitude and phase in the regions in the demodulated signal into which information symbols other than the PSK symbols are inserted are interpolated according to the detected variations in amplitude and phase. The information symbols are equalized according to the interpolated variations in amplitude and phase. Thus, optimum equalization is permitted for each of the information symbols.

In addition, according to the receiver of the invention, variations in phase or frequency are detected from the demodulated PSK symbols and the detected values are averaged to control the frequency of a regenerative carrier used in the quadrature demodulation means. This permits more accurate frequency synchronization of the regenerative carrier to be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 shows a transmission frame format illustrating an OFDM transmission system according to a first embodiment of the invention;

FIG. 7 shows a transmission frame format illustrating the OFDM transmission system according to the second embodiment of the invention;

FIG. 12 shows a transmission frame format illustrating an OFDM transmission system according to still another embodiment of the invention;

FIG. 14 shows a transmission frame format illustrating an OFDM transmission system according to a still further embodiment of the invention;

FIG. 15 shows a transmission frame format illustrating an OFDM transmission system according to another embodiment of the invention; and FIG. 16 shows a transmission frame format illustrating an OFDM transmission system according to a further embodiment of the invention.

DETAILED DESCRIPTION OF THE PREFERRED EMBODIMENTS

Figure 1:
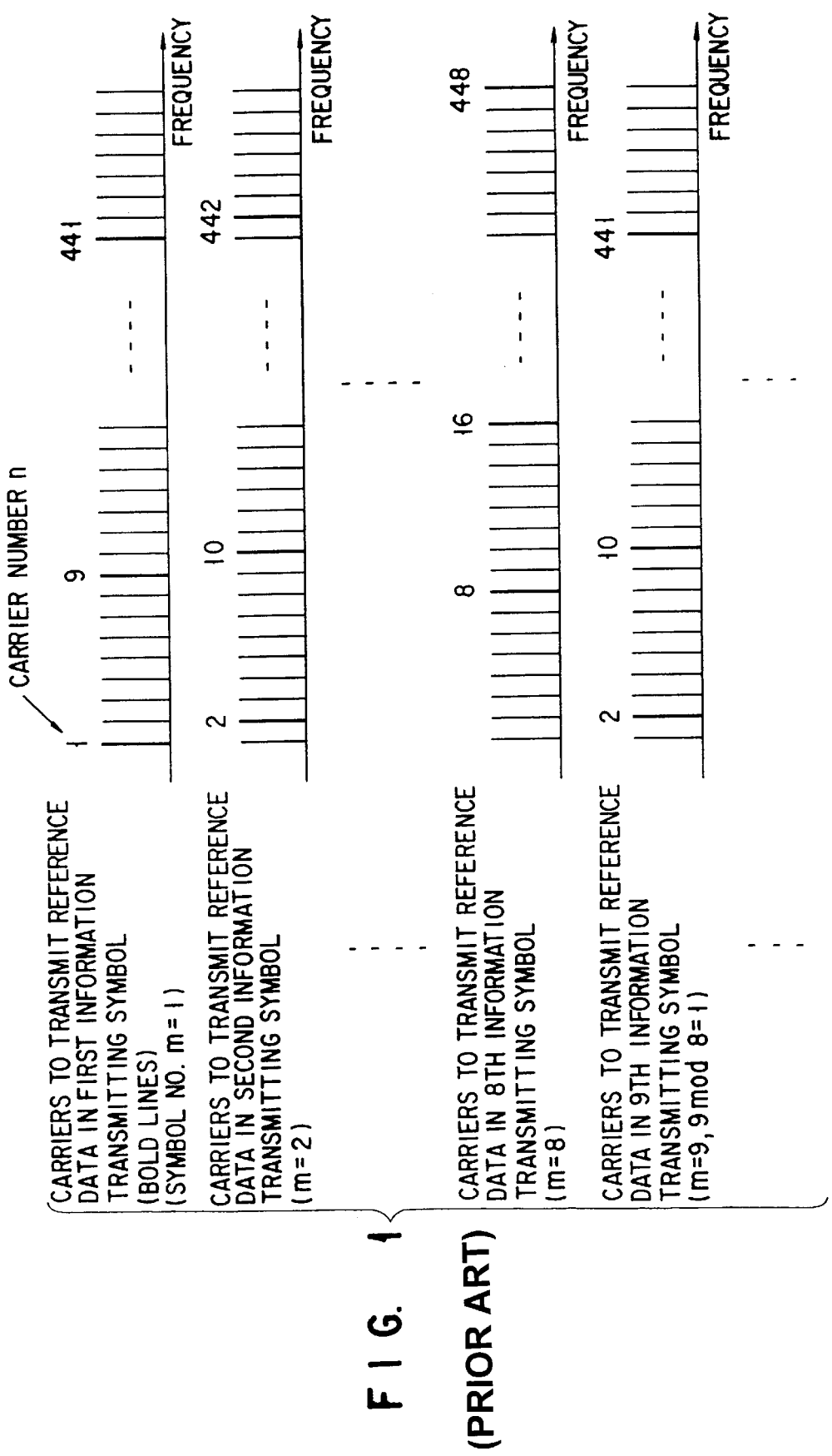
FIG. 1 is a diagram for use in explanation of a conventional OFDM system.

Referring now to FIG. 1, there is shown an example of a conventional OFDM transmission system, which is described in "Study of Modulation Method for Terrestrial Digital Broadcasting Using Multi-Valued OFDM" (the Journal of the Institute of Television Engineering, Japan, vol. 47, No. 10, pp 1374–1382, 1993). In this example, the number of carriers in one OFDM symbol is 448, and for each OFDM symbol one eighth of 448 pieces of data are reference data whose amplitude and phase are already known. Effective data other than the reference data is transmitted as 16 QAM symbols. Since the position of carriers to transmit reference data is shifted for each OFDM symbol, one carrier will transmit the reference data every eight symbols.

Thus, a transmission frame is constructed from a plurality of OFDM symbols, and reference data are placed in predetermined positions in the transmission frame for transmission. At the receiving end, frame synchronization is reestablished to receive the reference data, and then reference amplitude and phase are obtained from the reference data to demodulate the 16 QAM symbols.

The interval at which the reference data is transmitted is determined by taking into consideration the variations in the received signal due to fading. In the case of mobile reception in city areas, a large number of radio waves coming from various directions interfere with one another and so the envelope and the phase of a received wave will vary randomly. The envelope and the phase vary in accordance with the Rayleigh distribution and the uniform distribution, respectively. On such a Rayleigh channel, received waves vary in time and frequency but are considered almost constant within a certain time interval and a certain frequency range, which are referred to as a coherent time and a coherent bandwidth, respectively.

In FIG. 1, the interval at which reference data is transmitted is required to be much smaller than the coherent time of a channel.

However, with the OFDM transmission system as described above, the transmission of reference data reduces the data transmission efficiency decreases. In the example of FIG. 1, each carrier transmits reference data every eight symbols. Thus, the transmission efficiency will be decreased to ⅞.

In the present invention, a transmission frame is constructed at the transmitting end, such that a plurality of slots are arranged two-dimensionally along time and frequency axes. Reference symbols are placed into predetermined slots in this transmission frame. Into the other slots in the transmission frame are placed a plurality of information symbols modulated by multiple digital modulation methods including at least PSK modulation. Specifically, PSK information symbols modulated by at least the PSK modulation method and information symbols modulated by another modulation method (for example, QAM modulation) are placed into the other slots.

At the receiving end, variations in the amplitude and phase of a received signal are detected from the PSK information symbol in the received transmission frame. The results of this detection processing are used to correct the reference symbols in the transmission frame. Further, the corrected reference symbol are used to demodulate the information symbols.

Hereinafter, the preferred embodiments will be described more specifically.

The first embodiment is described below.

FIG. 2, which is a diagram for use in explanation of an OFDM system according to a first embodiment of the invention, shows a transmission frame format in which the number of carriers of an OFDM symbol is N (the number of effective carriers is n) and the number of OFDM symbols in one frame is M. In this embodiment, one frame is composed of N×M symbol data positions (slots) with N frequency slots arranged along the frequency axis and M time slots arranged along the time axis. At both ends of the transmission frame along the frequency axis are placed unused regions in which the carrier amplitude is set to zero.

In FIG. 2, in the first time slot of the transmission frame, an OFDM symbol is transmitted in which all the carriers are zero in amplitude. This OFDM symbol is called a null symbol and used in the receiver as a reference symbol for timing synchronization. In the second time slot, a reference OFDM symbol is transmitted in which the phase and amplitude of each carrier is already known. These reference signals are used in the receiver as a synchronization reference symbol adapted to recognize the frame and as demodulation reference signals for demodulating the phase and amplitude of each carrier. In the remaining time slots including the third time slot, information symbols composed mainly of multi-valued QAM information symbols are transmitted.

In and after the third OFDM symbol regions, QPSK information symbols which are regularly spaced in frequency and time as shown in FIG. 2 are placed among the multi-valued QAM information symbols. The time spacing and the frequency spacing of the QPSK symbols are determined in consideration of the coherent time and the coherent bandwidth of a channel.

On the other hand, at the receiving end to receive the OFDM modulated signal in the above-described transmission format, the amplitude and phase of each carrier are sought when the reference symbols are received and are used as the basis for demodulating the information symbols. On a fading channel, however, the amplitude and phase of a received signal vary in time and frequency. Thus, the variations in amplitude and phase of the received signal are detected through the QPSK information symbols periodically contained in the information symbols.

The QSPK information symbols are constant in amplitude and represent four phases at intervals of 90°. If, therefore, a variation in phase of a received signal is within ±45° in the interval at which the QPSK information symbols are transmitted, it will be possible to detect variations in amplitude and phase. For time slots and frequency slots in which no QPSK information symbol is transmitted, the detected variations in amplitude and phase of QPSK information symbols are interpolated with respect to time and frequency. The resulting interpolated information is used as variations for information symbols in portions in which no QPSK information symbol is transmitted in FIG. 2.

At the receiving end, variations in amplitude and phase of a received signal obtained in the above manner are used to correct the detected reference symbol. And information symbols in time—frequency slots are demodulated by using the corrected reference symbols.

Next, an OFDM transmitter and an OFDM receiver to which the OFDM transmission system described above is applied will be described.

Figure 3:
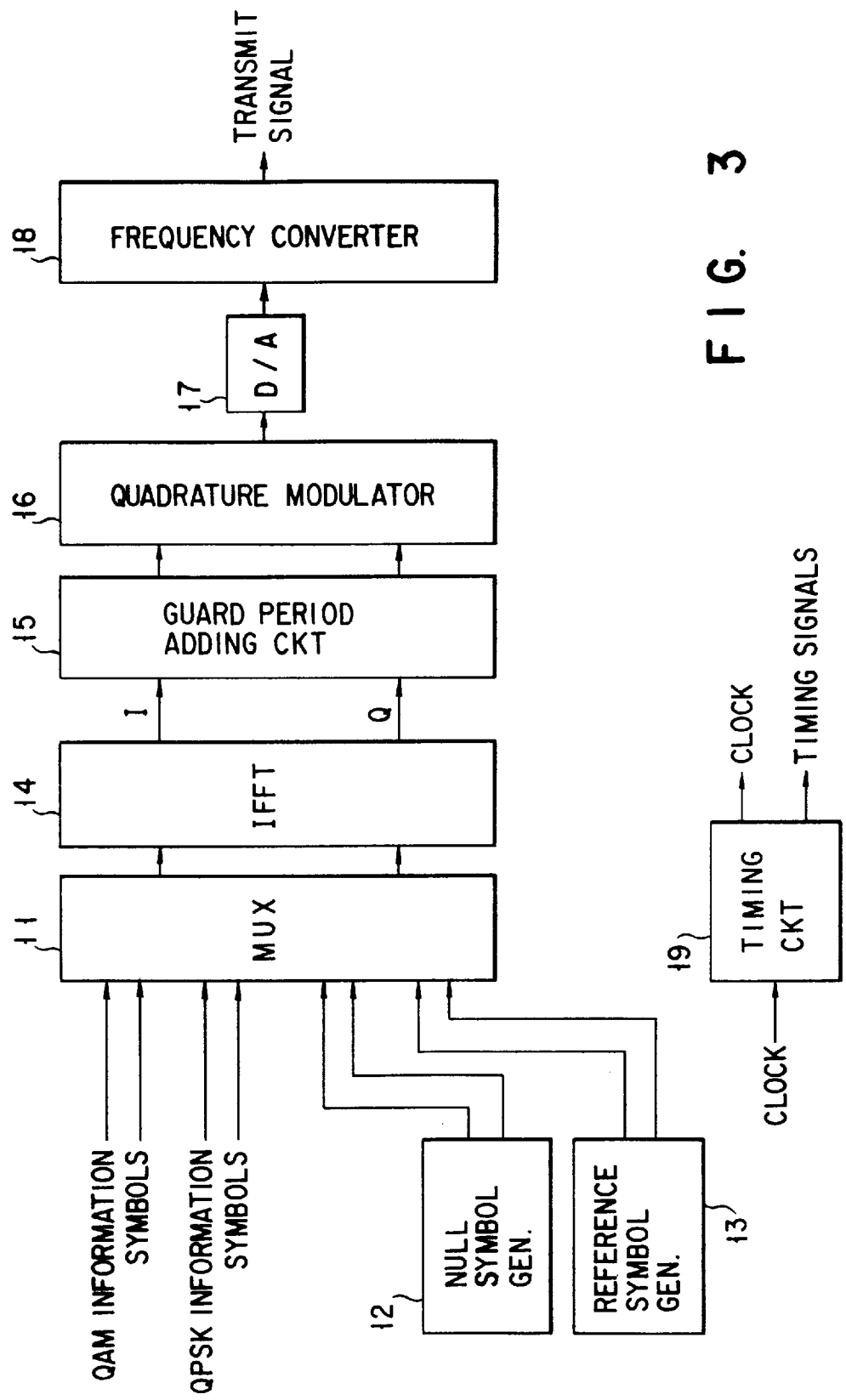
FIG. 3 is a block diagram of a transmitter adapted for the OFDM transmission system according to the first embodiment of the invention.

In FIG. 3, there is shown, in block diagram form, the main portion of the OFDM transmitter.

In this figure, a multiplexer (MUX) 11 receives multi-valued QAM information symbols and QPSK information symbols as information symbol data.

Here, the multi-valued QAM information symbol and the QPSK information symbol to be transmitted may be high-level data and low-level data, respectively, in hierarchically structured data. For example, high-frequency component and low-frequency component of an image signal are processed as high-level data and low-level data, respectively, in hierarchically structured data. Moreover, the QAM information symbol and the QPSK information symbol may be independent types of data.

A null symbol generator 12 generates null symbol data in which each carrier is zero in amplitude, which is applied to the multiplexer 11. A reference symbol generator 13 generates reference symbol data used as a reference for the amplitude and phase of each carrier, which is applied to the multiplexer. The multiplexer multiplexes the multi-valued QAM information symbols, the QPSK information symbols as information symbol data, the null symbol data, and the reference symbol data, thereby forming a transmission frame as shown in FIG. 2. The reference symbol data has amplitude and phases which are already known. A sine-sweep signal is an example of the reference symbol data. In the receiving side, it is used for demodulation and fine timing synchronization.

When another reference symbol for timing synchronization is transmitted, QPSK symbols whose phases are known and random to each other are used for the reference symbol data.

The multiplexed symbol data output from the multiplexer 11 is applied to an inverse fast discrete Fourier transformer (IFFT) 14, which performs an IFFT operation on N items of symbol data to produce a baseband OFDM signal. The modulated signal is then applied to a guard period adding circuit 15, by which a latter portion of an OFDM symbol is copied into a former portion of that symbol as a guard period in order to reduce the effect of multipath interference. One OFDM symbol consists of N carriers.

The OFDM modulated signal from the guard period adding circuit 15 is applied to a quadrature modulator 16 to modulate carriers having a 90-degree phase difference. An output signal of the quadrature modulator is converted by a digital-to-analog converter (D/A) 17 into an analog signal, which is then converted by a frequency converter 18 to a given carrier frequency for transmission.

A timing circuit 19 responds to a clock signal from a clock generator (not shown) to produce a clock and timing signals necessary for the above-described circuits to operate properly.

In such a configuration, one transmission frame is produced by the multiplexer 11 in such a way that QPSK information symbols are periodically placed among multi-valued QAM information symbols in the information symbol region. This transmission frame is OFDM modulated and then converted up to a transmission carrier frequency for transmission.

Figure 4:
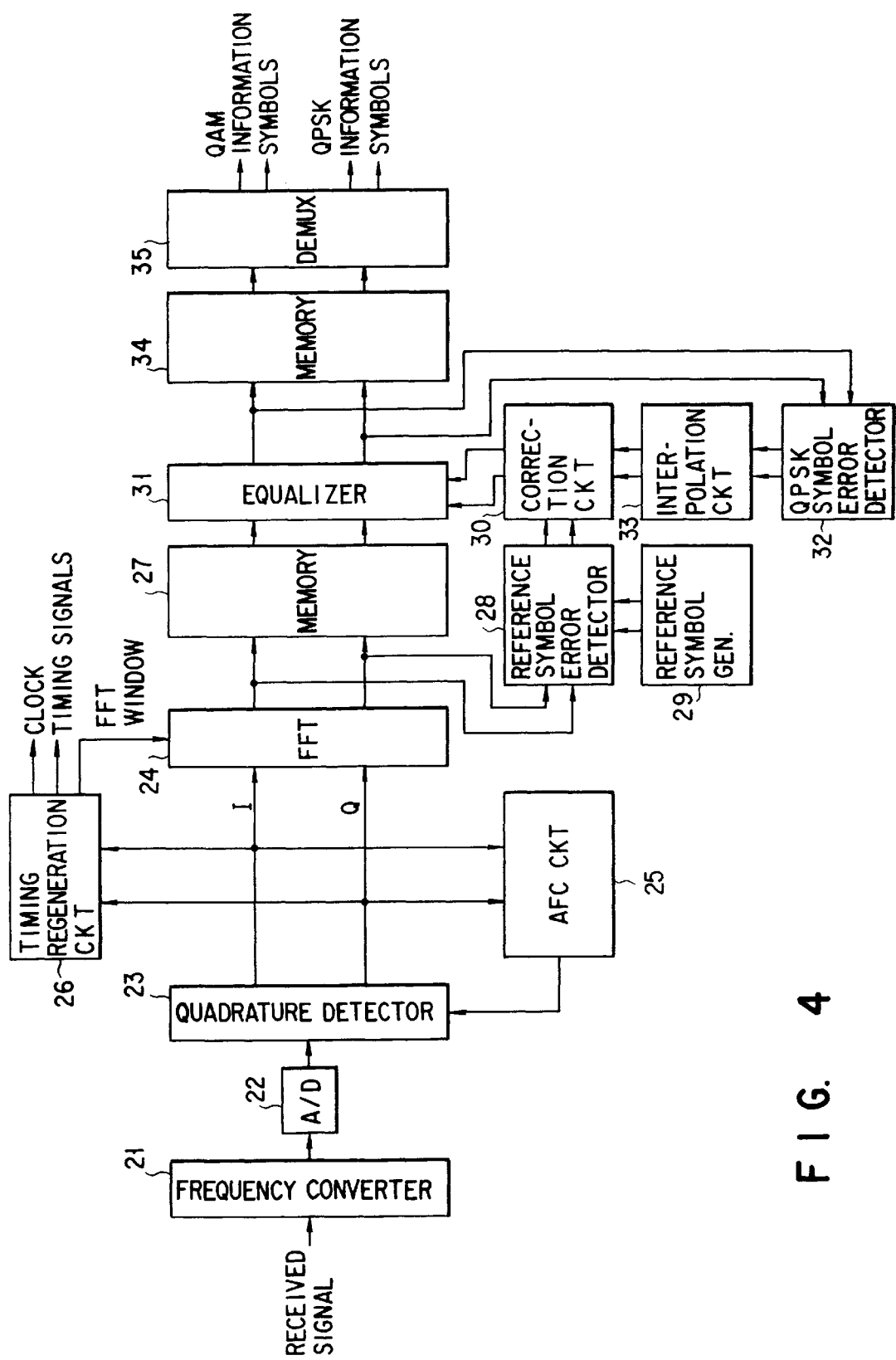
FIG. 4 is a block diagram of a receiver adapted for the OFDM transmission system according to the first embodiment of the invention.

FIG. 4 shows a block diagram forming the principal parts of an OFDM receiver.

In this figure, a radio modulated signal transmitted from the transmitter over a radio channel is frequency-converted by a frequency converter 21 to a given intermediate frequency and then converted by an analog-to-digital signal (A/D) 22 into a digital signal, which, in turn, is applied to a quadrature detector 23. The quadrature detector 23 detects the OFDM modulated signal of the intermediate frequency with a regenerative carrier to thereby output the baseband OFDM modulated signal.

An automatic frequency control (AFC) circuit 25 detects a frequency error of the regenerative carrier on the basis of the frequency of the OFDM modulated signal from the quadrature detector 23 and produces a signal used to control the frequency of the regenerative carrier. The frequency control signal is fed back to the quadrature detector 23 to control the frequency of the regeneration carrier produced within the quadrature detector, thereby achieving carrier synchronization.

The OFDM modulated signal output from the quadrature detector 23 is also applied to a timing regeneration circuit 26, which regenerates timing signals, such as a symbol sync signal, a frame sync signal, and the like, and a clock signal on the basis of the reference symbol contained in the OFDM modulated signal, and supplies them to each circuit in the receiver. The timing regeneration circuit 26 generates an FFT window indicating the effective symbol portion of the OFDM symbol and then supplies it to a fast discrete Fourier transformer (FFT) 24.

The FFT 24 is responsive to the FFT window from the timing circuit 26 to perform an FFT operation on the effective symbol portion of the OFDM symbol in the OFDM modulated signal output from the quadrature detector 23. By this FFT operation, complex data is obtained which represents the amplitude and phase of each carrier.

The complex data is entered into a memory 27, which holds given regions containing QPSK information symbols in the information symbol region of the transmission frame. That is, as will be described below, variations in amplitude and phase of a channel are detected on the basis of the QPSK information symbols and the results of this detection are used to obtain two-dimensionally interpolated variations for portions in which no QPSK information symbol is transmitted. Because of the existence of a time to obtain the interpolated variations, it is necessary to use the memory 27 for holding data. Information symbols read from the memory 27 are entered into an equalizer 31 for equalization. Since the equalizing process needs a significant amount of time, the clock rate is increased to raise the data processing speed in the equalizer 31. Thus, the data read out speed of memory 27 is fast, that is, the data rate converting is executed. The clock-rate of output data from equalizer 31 is a high rate, and thus, a memory 34 reads the data at high speed. The output data from the memory 34 is converted at the clock-rate of the original clock-rate which is input state of memory 27.

The complex data output from the FFT 24 is also entered into a reference symbol error detector 28. In this detector, a comparison is made between a received reference symbol and a comparison reference symbol generated by a reference symbol generator 29 to detect an amplitude error and a phase error of each carrier. The amplitude error and the phase error are applied to a correction circuit 30 and corrected by variations as will be described below. The corrected amplitude and phase errors are applied to control terminals of the equalizer 31. The reference symbol generator 29 generates comparison reference symbols which correspond to n reference symbols transmitted in the second time slot of a transmission frame.

The receiver of the present embodiment is equipped with a QPSK symbol error detector 32, an interpolation circuit 33, and the correction circuit 30. The QSPK symbol error detector 32 detects offsets of each QPSK information symbol contained in symbol data output from the equalizer 31 from its proper amplitude and phase values. The detected values represent variations in amplitude and phase of a received signal due to fading.

The interpolation circuit 33 obtains interpolated variations for equalizing information symbols in slots in which no QPSK symbol is transmitted within the information symbol region held in the memory 27 by the use of the detected variations from the QPSK symbol error detector 32. Thus, variations in amplitude and phase from the time of receipt of reference symbols are detected for each of the time—frequency slots that are held in the memory 27.

The correction circuit 30 corrects the amplitude error signal and the phase error signal obtained by the reference symbol error detector 28 using the interpolated variations from the interpolation circuit 33. The corrected amplitude and phase error signals are applied to the equalizer 31 to equalize the information symbols which have been held in the memory 27.

The symbol data output from the equalizer 31 is held in a memory 34 temporarily, the output data from the memory 34 is converted to its lower its speed, then applied to a demultiplexer 35. The demultiplexer removes the null symbols and the reference symbols and outputs the multi-valued QAM information symbols and the QPSK information symbols separately.

In operation, assume that symbol data of the first frame are output from the quadrature detector 23 and the FFT 24. Then, the first data region of the symbol data of the first frame is held in the memory 27. At this point, the reference symbol error detector 28 makes a comparison between the received reference symbols in the demodulated symbol data and the comparison reference symbols to detect an amplitude error and a phase error of each carrier. The resulting amplitude and phase error signals are applied to the equalizer 31 via the correction circuit 30. In the equalizer, therefore, the symbol data in the first data region held in the memory 27 are subjected to equalization based on the amplitude and phase error signals.

When the equalized symbol data are output from the equalizer 31, the QPSK information symbol error detector 32 detects offsets of the QPSK symbols in the symbol data from their proper amplitude and phase values. That is, variations in the amplitude and phase of the received wave due to fading are detected. By using the detected variations, the interpolation circuit 33 obtains interpolated variations for slots in which no QPSK information symbol is transmitted. Thereby, variations in the amplitude and phase of symbols from the time of receipt of the reference symbols are detected for each of the time and frequency slots in the data region held in the memory 27.

When amplitude and phase variations in each slot are detected, the correction circuit 30 corrects the amplitude error and the phase error of each carrier which have been detected by the reference symbol error detector 28 by the amplitude and phase variations. The corrected amplitude and phase error signals are applied to the equalizer 31. Thus, in the equalizer 31, all the slots in the first data region held in the memory 27 are subjected to equalization based on the corrected amplitude and error signals.

The equalized symbol data in the first data region are entered via the memory 34 into the demultiplexer 35, where the symbol data are separated into the multi-valued QAM information symbols and the QPSK information symbols for subsequent application to a succeeding signal processing circuit after the null symbols and the reference symbols have been removed.

After that, the above-described equalization process is performed repeatedly each time the next data region of demodulated symbol data is held in the memory 27. In each of subsequent equalization processes, outputs of the correction circuit 30 obtained in the last time slot in the equalization process for the previous data region are used as its initial values.

Therefore, if the receiver thus arranged, variations in amplitude and phase of a received wave are detected from multiple QPSK information symbols periodically inserted into the information symbol data region of a transmission frame, amplitude and phase errors of each carrier detected from reference symbols are corrected by the detected amplitude and phase variations, and waveform equalization is performed on demodulated symbol data by the corrected amplitude and phase errors. This permits amplitude and phase variations due to fading to be corrected without inserting a large number of reference symbols into a transmission frame.

That is, in the present embodiment, an OFDM transmission frame is generated and transmitted such that null symbols and reference symbols are placed only at the beginning of that frame, and QPSK information symbols are placed into the information symbol data region at regular intervals in both time and frequency. In the receiver, on the other hand, amplitude and phase errors of each carrier are detected from the reference symbols placed at the beginning of that transmission frame, variations in amplitude and phase of a received wave are detected from the QPSK information symbols, the amplitude and phase errors of each carrier detected from the reference symbols are corrected by the detected amplitude and phase variations to produce corrected amplitude and phase error signals, and demodulated symbol data are equalized by the corrected amplitude and phase error signals.

According to the present embodiment, therefore, without inserting any reference symbol into the information symbol data region of a transmission frame, variations in amplitude and phase of demodulated symbol data due to fading can be certainly equalized to reproduce information symbol data correctly. That is, multi-valued QAM information symbols and QPSK information symbols can be both utilized for information transmission.

The multi-valued QAM information symbol and the QPSK information symbol may be transmitted as high-level data and low-level data, respectively, of hierarchically structured data. Moreover, the QAM information symbol and the QPSK information symbol may be independent types of data.

Thus, it becomes possible to use all the information symbol data region for information transmission, which will result in increased information transmission efficiency. That is, high-quality, high-efficiency information transmission can be realized even where fading transmission channels are used as in mobile communication systems.

In the transmitter, the QPSK information symbols are inserted at regular intervals for transmission and, in the receiver, amplitude and phase variations detected by the QPSK information symbols are used to interpolate amplitude and phase variations of the multi-valued QAM information symbols. For this reason, it becomes possible to perform optimum equalization on each of the information symbols. In addition, high-rate transmission characteristics based on the multi-valued QAM system can be maintained.

Figure 5:
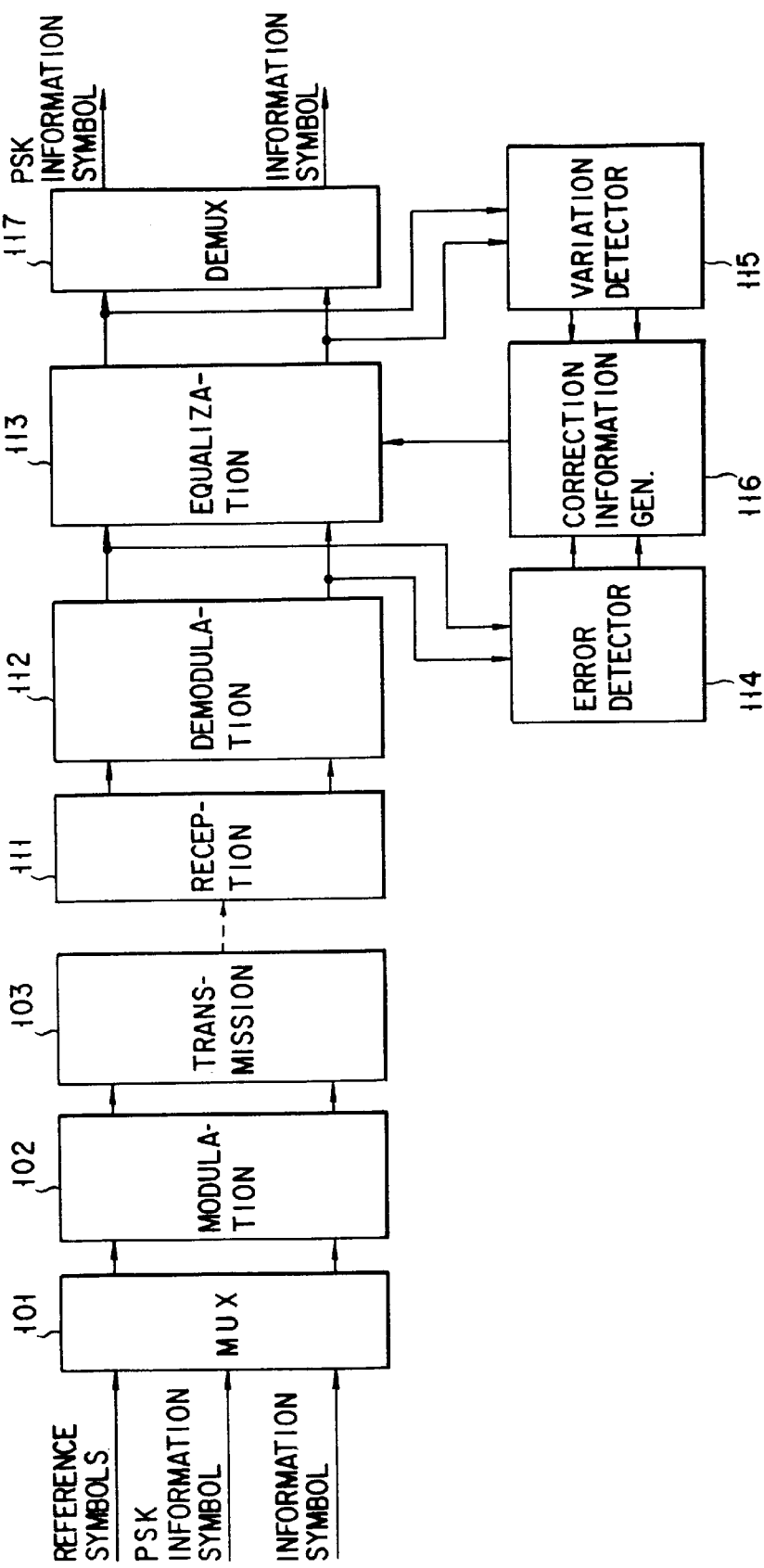
FIG. 5 shows in block diagram form the entire configuration of the transmission and reception system based on the OFDM transmission system of the invention.

FIG. 5 collectively shows the principal parts of the receiver and the transmitter described above.

A multiplexer section 101 forms a transmission frame in which a plurality of slots are arranged two-dimensionally along the the time and frequency axes, inserts reference symbols into restricted slots in the transmission frame, and inserts PSK information symbols subjected to PSK modulation and information symbols subjected to other digital modulation than the PSK modulation into the other slots in the transmission frame in a predetermined positional relation with respect to each other, whereby the reference symbols, the PSK information symbols and the information symbols are multiplexed. A modulation section 102 subjects the transmission frame to orthogonal frequency division multiplexing modulation. A transmitting section 103 subjects output signals of the modulation section to orthogonal modulation for transmission. In the receiver, on the other hand, a receiving section 111 receives and demodulates the orthogonal frequency division multiplexing modulated signal to obtain orthogonal demodulated signals. A demodulation section 112 subjects the demodulated signals from the receiving section to orthogonal frequency division multiplexing demodulation to obtain demodulated signals. Each symbol in the demodulated signals has its amplitude and phase equalized in an equalization section 113.

An error detecting section 114 detects amplitude and phase errors of carriers on the basis of the reference symbols in the demodulated signals output from the demodulation section 112. On the other hand, a variation detecting section 115 detects amplitude and phase variations of the received signal on the basis of the PSK information symbols in the demodulated signals output from the equalizing section 113. A correction information producing section 116 produces correction information on the basis of the amplitude and phase errors of the carriers and the amplitude and phase variations of the received signal and supplies it to the equalizing section 113. Good PSK information symbols and information symbols subjected to equalization in the equalization section 113 are separated by a separation section 117.

The second embodiment of the present invention is described below.

The second embodiment is an improvement over the first embodiment and subjects QPSK information symbols arranged in the information symbol data region with equal spacings in time and frequency to differential coding for transmission.

Figure 6:
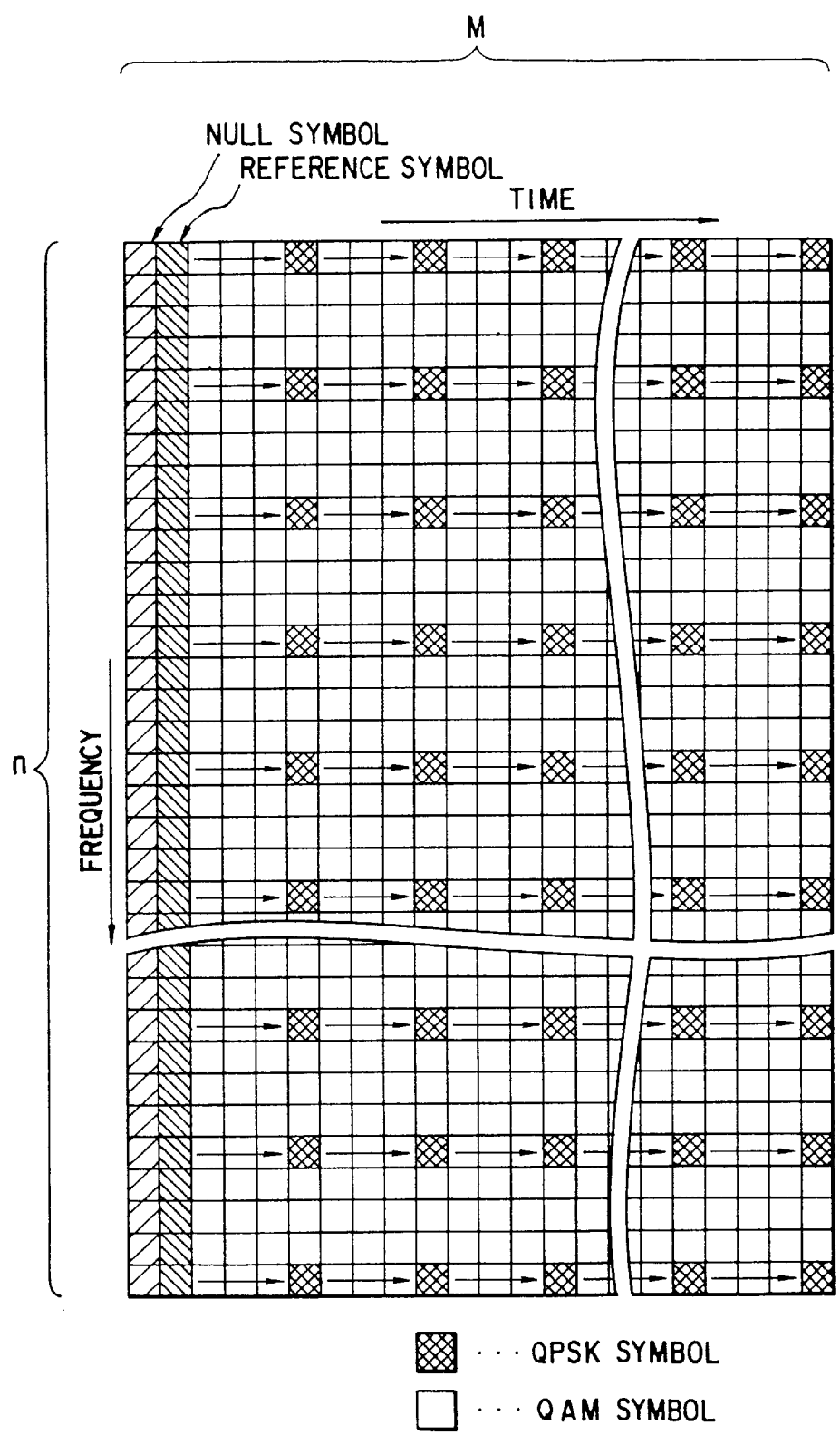
FIG. 6 shows a transmission frame format illustrating an OFDM transmission system according to a second embodiment of the invention.

FIGS. 6 and 7 show transmission frame formats using the OFDM transmission system according to the second embodiment. Only the effective symbol region is shown in these figures.

In the OFDM transmission system of FIG. 6, reference symbols in the second time slot of the frame are utilized as the basis of differential coding. Each QPSK information symbol in the information symbol data region is sequentially subjected to differential coding in the direction indicated by arrows, i.e., along the time axis. This transmission system is advantageous where variations in a channel with time are small.

On the other hand, in the OFDM transmission system of FIG. 7, a reference symbol that is transmitted by a carrier of the lowest frequency is used as the basis of differential coding. Each QPSK information symbol in the information symbol data region is sequentially subjected to differential coding along the frequency axis as indicated by arrows. This transmission system is advantageous where variations in a channel with frequency are small.

Other differential coding methods are possible. That is, the arrangement of QPSK information symbols and the direction of differential coding may vary according to the characteristics of the transmission channels.

Figure 8:
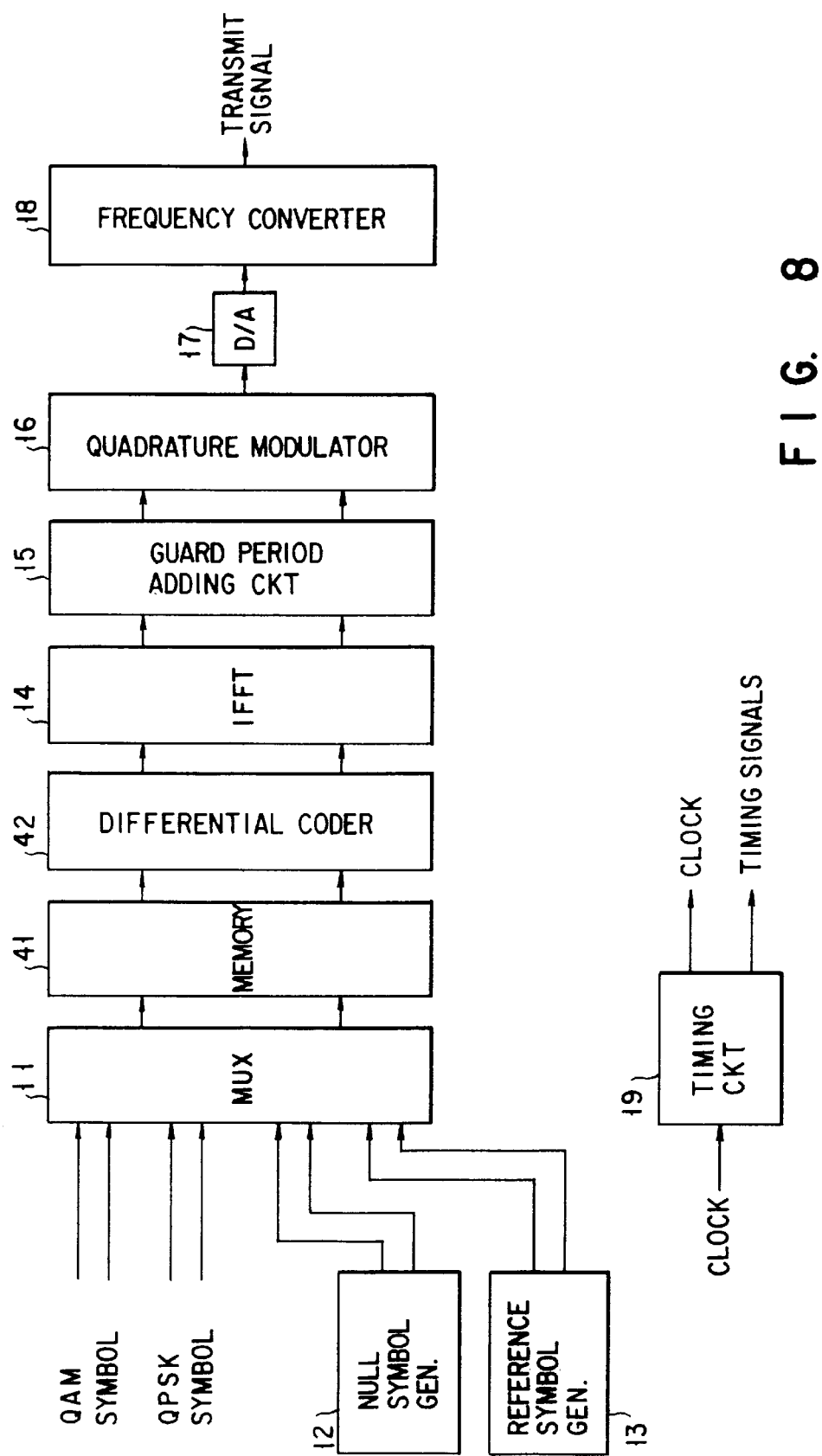
FIG. 8 is a block diagram of a transmitter adapted for an OFDM transmission system according to a third embodiment of the invention.

FIG. 8 is a block diagram of an OFDM transmitter adapted to such a system for transmitting QPSK information symbols by differential coding. In this figure, like reference numerals are used to denote corresponding parts to those in the transmitter of FIG. 3 and the detailed description thereof will be omitted.

Between the multiplexer 11 and the IFFT 14 is placed a differential coder 42 which is preceded by a memory 41. The memory 41 temporarily stores multiplexed symbol data output from the multiplexer 11 for subsequent differential coding. The differential coder 42 differentially codes QPSK information symbols in the multiplexed symbol data read from the memory 41 along the time axis or the frequency axis with a reference symbol or symbols used as the basis of differential coding.

By using such a transmitter, each QPSK information symbol arranged in the information symbol data region of a frame is sequentially transmitted in the differentially coded form. In a receiver for receiving such a transmission frame, therefore, a differential detector can be used to demodulate the QPSK information symbols. This will also permit a simple type of receiver to be implemented which is designed to receive only the QPSK information symbols.

The third embodiment of the present invention is described below.

The third embodiment is intended to implement a simple type of receiver for receiving only QPSK information symbols by differentially coding the QPSK information symbols in transmitting hierarchically related data or independent data through multi-valued QAM information symbols and the QPSK information symbols.

Figure 9:
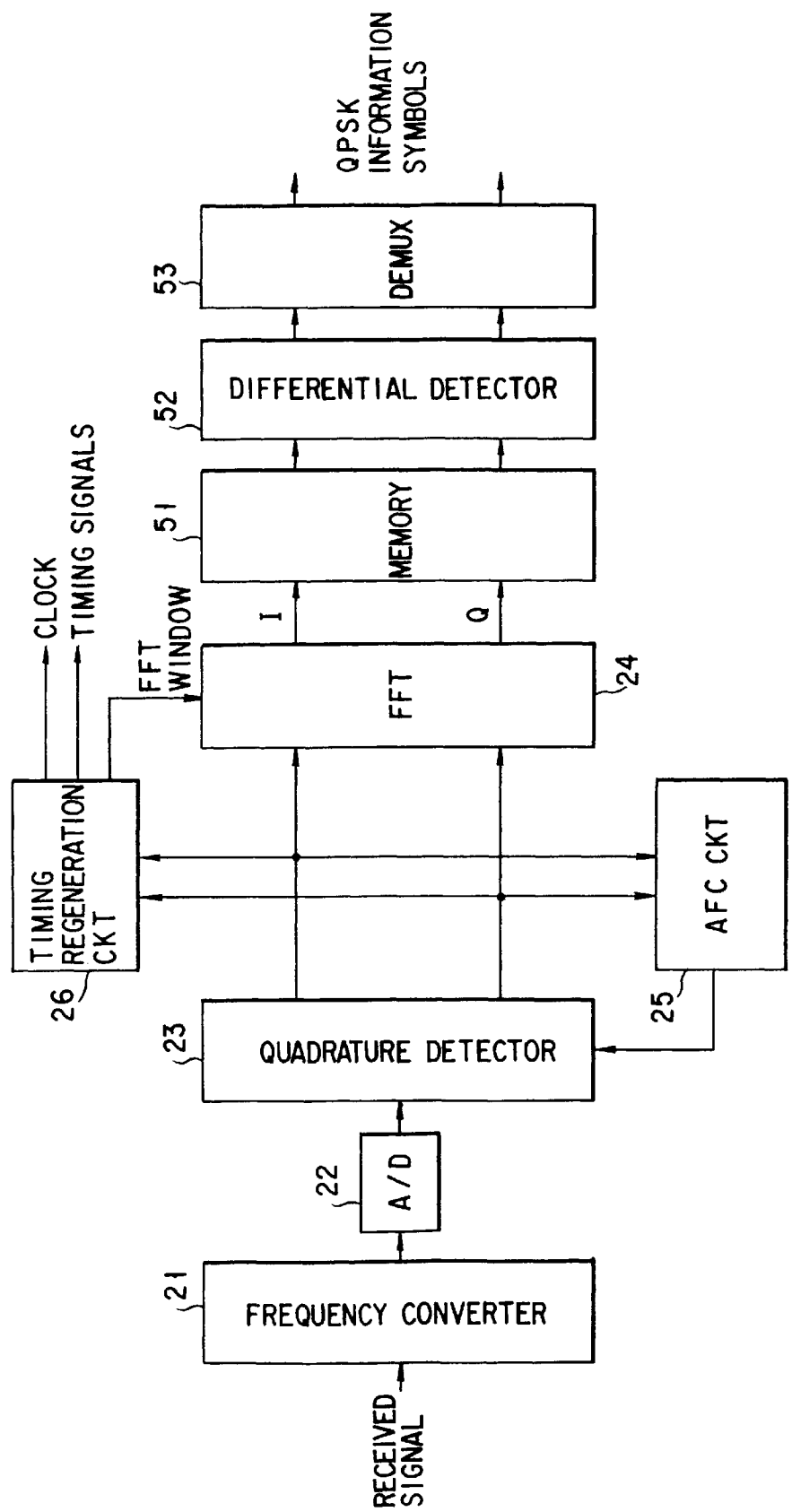
FIG. 9 is a block diagram of a receiver adapted for the OFDM transmission system according to the third embodiment of the invention.

FIG. 9 is a block diagram of a receiver which is adapted for an OFDM transmission system according to the third embodiment. In this figure, like reference numerals are used to denote corresponding parts to those in the receiver of FIG. 4 and detailed description thereof will be omitted.

In this receiver, symbol data, i.e., complex data, output from the FFT 24 is stored temporarily in a memory 51 and then entered into a differential detector 52. In this detector, differential detection is performed on the QPSK information symbols in the symbol data stored in the memory 51 by using the current symbol and the preceding one in the order of differential coding. The symbol data output of the differential detector 52 is applied to the demultiplexer 35 where only the demodulated QPSK information symbols are selectively output.

By causing the multi-valued QAM information symbols and the QPSK information symbols to carry independent data and differentially encoding the QPSK information symbols for transmission in this manner, a simple type of receiver can be constructed which demodulates only the differentially coded QPSK information symbols by differential detection. This type of receiver would be a pager by way of example.

The fourth embodiment of the present invention is described below.

According to the fourth embodiment, in an OFDM receiver, a regenerative carrier frequency control signal is produced on the basis of the result of detection of variations in the phase of QPSK information symbols and the frequency control signal is fed back to a quadrature detector, thereby permitting variable control of the regenerative carrier frequency.

Figure 10:
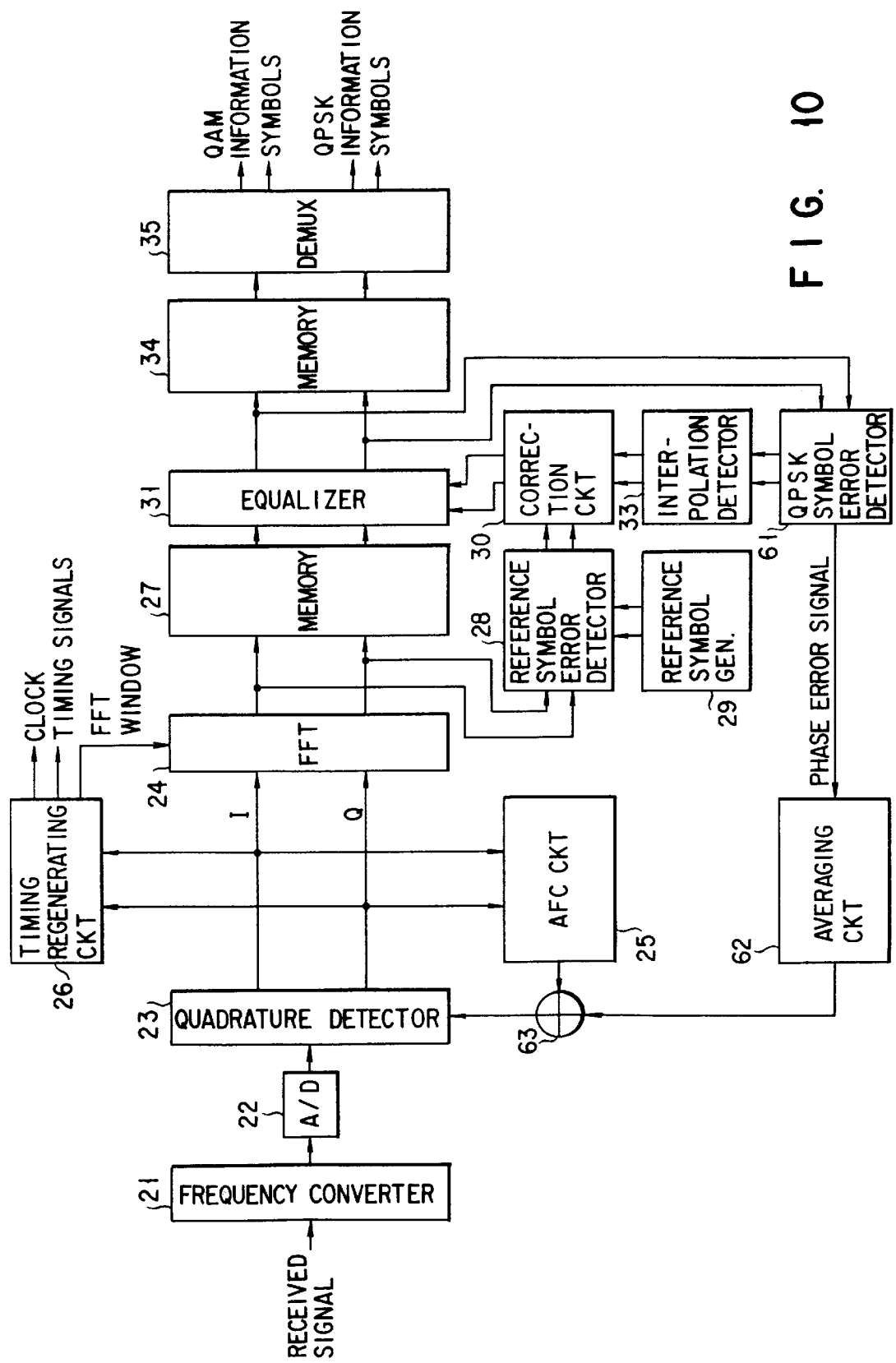
FIG. 10 is a block diagram of a receiver adapted for an OFDM transmission system according to a fourth embodiment of the invention.

FIG. 10 is a block diagram of an OFDM receiver according to the fourth embodiment. In this figure, like reference numerals are used to denote corresponding parts to those in the receiver of FIG. 4 and the detailed description thereof will be omitted.

In FIG. 10, phase variations detected by a QPSK symbol error detector 61 are into an averaging circuit 62 where averages are calculated. An output signal of the averaging circuit 62 is added in an adder 63 to a frequency error signal from the AFC circuit 25, thereby producing a frequency control signal. The frequency control signal is applied to the control terminal of a local oscillator of the quadrature detector 23. Thus, the regenerative carrier frequency will be controlled not only by the frequency error information produced by the AFC circuit 25 but also by variations in phase of QPSK information symbols.

Here, phase variations of QPSK information symbols are produced not only by variations in transmission channels but also by a frequency error of the regenerative carrier. A change in phase due to fading is random but a change in phase due to a carrier frequency error is constant for all the carriers. Thus, by averaging phase error signals obtained by the QPSK symbol error detector 61, an error of the regenerative carrier frequency can be detected. By adding a signal representing the frequency error to an output signal of the AFC circuit 25 and then applying to the control section of the local oscillator of the quadrature detector 23, a more accurate frequency synchronization of the regenerative carrier can be achieved.

The fifth embodiment of the present invention will be described below.

According to the fifth embodiment, in the simple type of receiver which is described previously as the third embodiment and receives only QPSK information symbols, a regenerative carrier frequency control signal is produced on the basis of variations in phase of demodulated QPSK information symbols and then fed back to the quadrature detector, thereby performing variable control of the regenerative carrier frequency.

Figure 11:
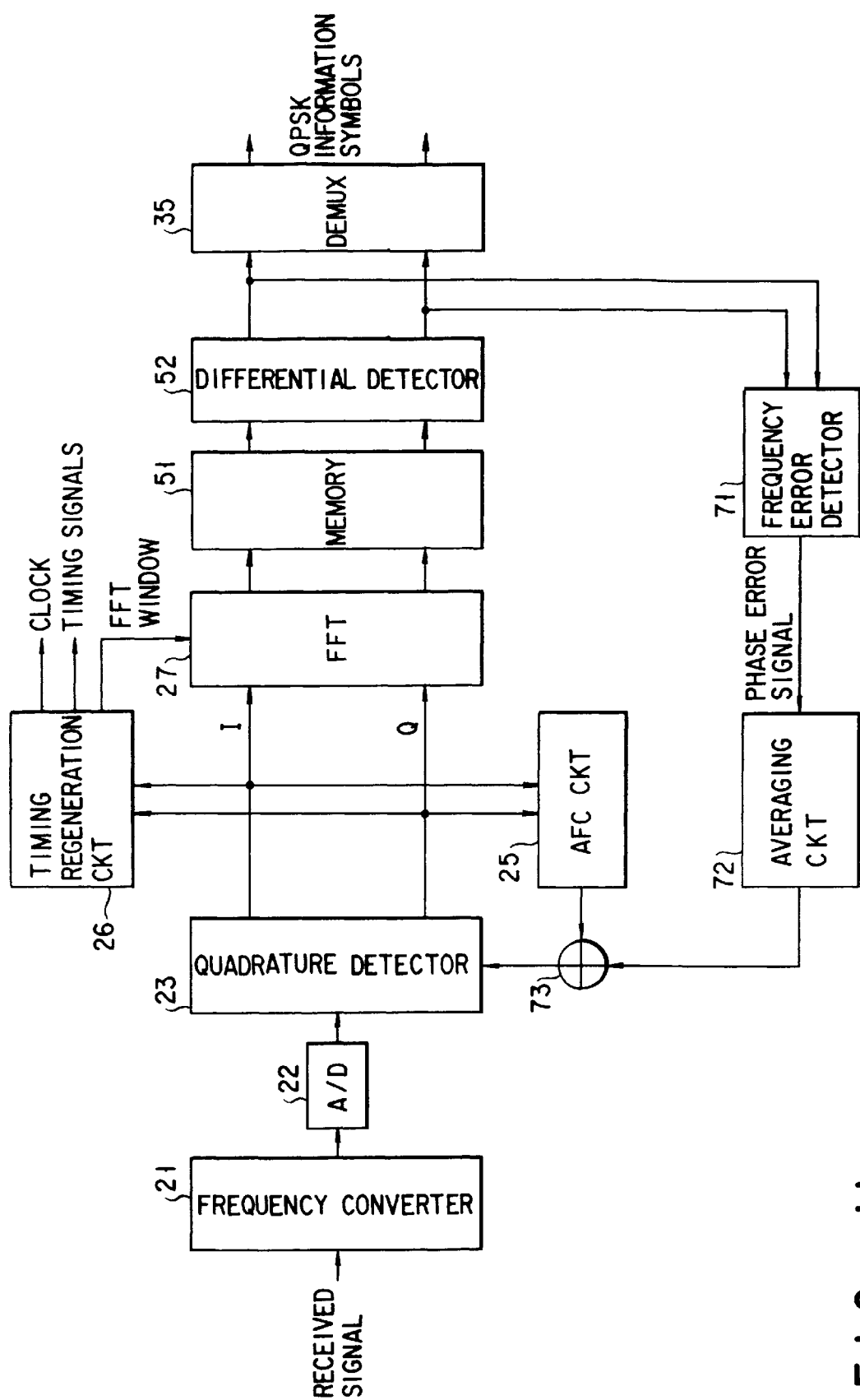
FIG. 11 is a block diagram of a receiver adapted for an OFDM transmission system according to a fifth embodiment of the invention.

FIG. 11 is a block diagram of an OFDM receiver according to the fifth embodiment. In this figure, like reference numerals are used to denote corresponding parts to those in the receiver of FIG. 9 and the description thereof is omitted.

In FIG. 11, the output of the differential detector branches to a frequency error detector 71, which detects a change in phase with time using QPSK information symbols demodulated by differential detection. The outputs of the frequency error detector 71 are averaged by an averaging circuit 72. An output signal of the averaging circuit 73 is added to the output of the AFC circuit 25 in an adder 73 whose output is coupled to the quadrature detector 23.

In the receiver thus arranged, variations in frequency of the regenerative carrier are detected by variations in phase of the QPSK information symbols, and then the frequency of the regenerative carrier is corrected accordingly. Thus, accurate frequency synchronization of the regenerative carrier can be achieved.

The OFDM transmission system of the present invention can be embodied in the following ways.

FIGS. 12 through 16 show transmission frame formats of the respective embodiments.

First, the system shown in FIG. 12 is identical to the first embodiment shown in FIG. 2 in carrier frequency assignment for QPSK information symbols, but the QPSK information symbols are staggered along the time axis. According to this system, although the number of QPSK information symbols per time slot is reduced, they are transmitted in all the time slots. Thus, variations in transmission channels can be detected effectively when they are small the frequency relation but great in the time relation.

Figure 13:
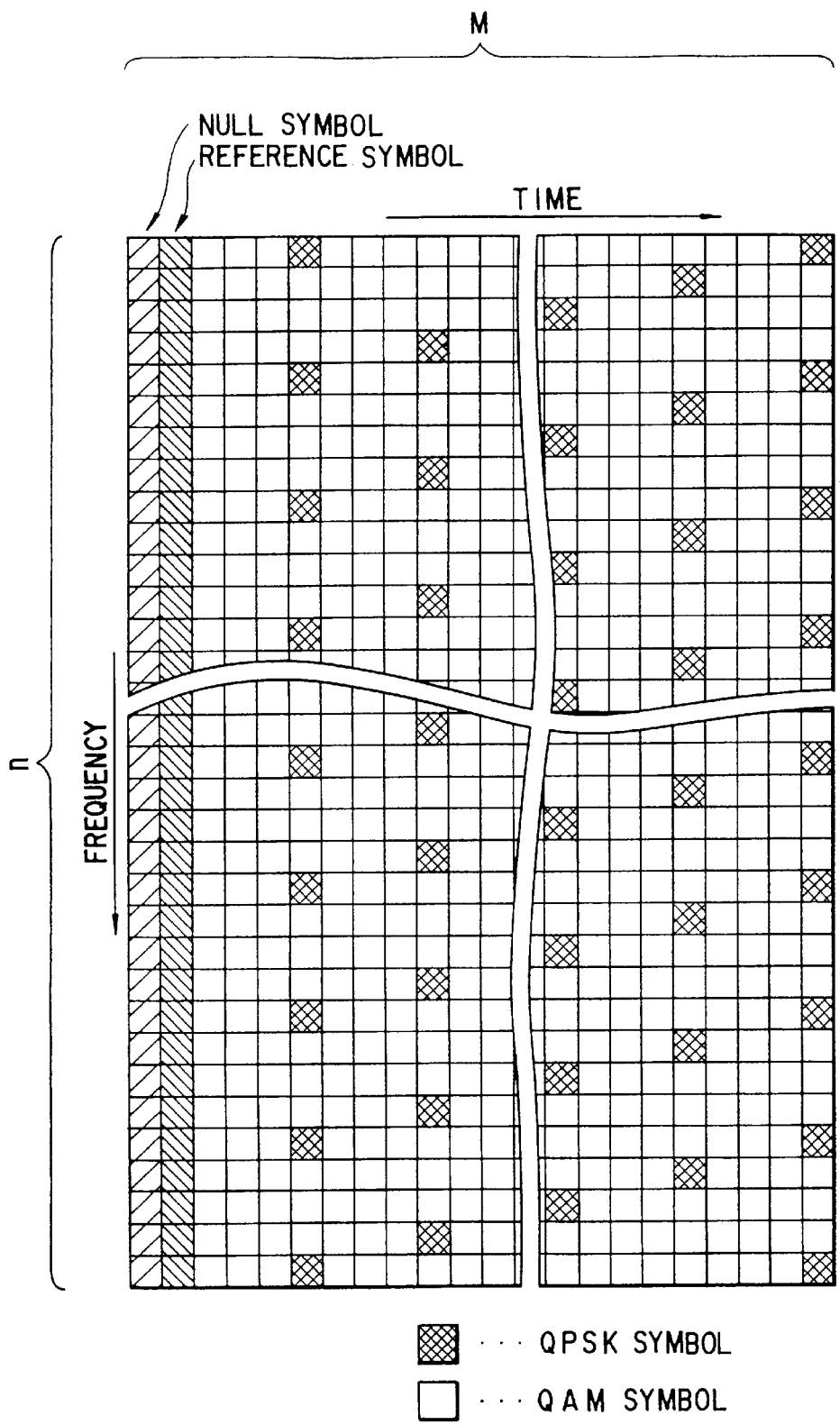
FIG. 13 shows a transmission frame format illustrating an OFDM transmission system according to a further embodiment of the invention.

Next, the system of FIG. 13 is identical to the first embodiment of FIG. 2 in time slot assignment for QPSK information symbols, but the QPSK information symbols are staggered in frequency. According to this system, although the number of QPSK information symbols per frequency slot is reduced, the symbols are transmitted in all the frequency slots. Thus, variations in transmission channels can be detected effectively when they are small in time but great in frequency.

Depending on the transmission path characteristics, combined use may be made of the system shown in FIG. 12 in which QPSK information symbols are transmitted in all the time slots and the system shown in FIG. 13 in which QPSK information symbols are transmitted in all the frequency slots.

The system shown in FIG. 14 is substantially the same as the first embodiment in that QPSK information symbols are equally spaced in time and frequency but differs in that QPSK information symbols of given frequencies are transmitted continuously in time.

The use of this system to transmit a frame allows the receiver to detect changes in the QPSK information symbols with time at given carriers continuously and correctly. Thus, it becomes possible to detect variations in transmission channel characteristics more correctly than the first embodiment. If there is a regenerative carrier frequency error in the receiver, then a phase rotation will occur in demodulated outputs when variations of a given carrier are viewed with respect to time. Thus, the continuous transmission of QPSK information symbols in given frequency slots as shown in FIG. 14 permits the regenerative carrier frequency error to be detected more accurately than the first embodiment.

The system shown in FIG. 15 is distinct from the system of FIG. 13 in that PQSK symbols at given carriers are transmitted continuously in time. As with the system described in connection with FIG. 14, this system also permits the regenerative carrier frequency error to be detected more accurately.

Finally, the system shown in FIG. 16 is distinct from the system of FIG. 12 in that PQSK information symbols at given carriers are transmitted continuously in time. As with the system described in connection with FIG. 13, this system also permits the regenerative carrier frequency error to be detected more accurately.

The invention is not limited to the above-described embodiments. For example, although the embodiments were described as using QPSK information symbols and multi-valued QAM information symbols as information symbols, the QPSK symbols may be replaced with other PSK symbols such as 8 PSK symbols, 16 PSK symbols, or the like, depending on transmission channel conditions. In addition, the multi-valued QAM information symbols may be replaced with information symbols based on another modulation method or multiple modulation methods.

The numbers of time slots and frequency slots in one transmission frame and the arrangement of the transmitter and receiver may be modified in still other ways without departing the scope of the present invention.

As described above, in the OFDM transmission system of the invention, at the transmitting end, a transmission frame is constructed and transmitted such that a plurality of slots are arranged two-dimensionally in time and frequency. Reference symbols are inserted into predetermined slots in the transmission frame, and a plurality of information symbols modulated by multiple digital modulation methods including at least the PSK modulation method are inserted into the other slots in a predetermined positional relationship depending on the digital modulation methods. At the receiving end, variations in amplitude and phase of a received signal are detected on the basis of the PSK symbols in the received transmission frame to correct the reference symbols in the transmission frame and the information symbols are demodulated on the basis of the corrected reference symbols.

According to the invention, therefore, orthogonal frequency division multiplexing transmission systems suitable for mobile communication systems and transmitters and receivers for use with the systems which permit multi-valued modulated symbols to be demodulated reliably even in fading environments and the amount of transmit reference data to be reduced to thereby improve the data transmission efficiency.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An orthogonal frequency division multiplexing transmission system for radio transmission of information from a transmitter to a receiver using orthogonal frequency division multiplexing modulation, wherein said transmitter comprises:
a multiplexing means for forming a transmission frame,
a modulation means for modulating the transmission frame, and
transmitting means for transmitting output signals of said modulation means, wherein said multiplexing means is arranged such that the transmission frame is configured in which a plurality of slots are arranged two-dimensionally along time and frequency axes, reference symbols are inserted into predetermined simultaneous slots in said transmission frame, and PSK information symbols subjected to digital modulation with a higher value level than said PSK modulation are inserted into other slots in a selected positional relation with respect to each other, and said receiver comprises:
a receiving means for receiving and demodulating a transmitted signal, and for obtaining orthogonal demodulated signals.

a demodulating means for demodulating the orthogonal demodulated signals to obtain received symbols, and an equalizing means for equalizing amplitude and phase of said symbols, wherein said receiver is arranged such that variations in amplitude and phase of said received symbols are detected from said PSK information symbols in said transmission frame, said reference symbols in said transmission frame are corrected on the basis of detected variations in amplitude and phase, and said information symbols received are demodulated on the basis of the corrected symbols.

2. The system according to claim 1, wherein said transmitter inserts said PSK information symbols into slots of said transmission frame which are equally spaced in time and frequency.

3. The system according to claim 1, wherein said transmitter inserts said PSK information symbols into slots of said transmission frame which are equally spaced along the time axis but are varied with time along the frequency axis.

4. The system according to claim 1, wherein said transmitter inserts said PSK information symbols into slots of said transmission frame which are equally spaced in frequency but are varied with frequency along the time axis.

5. The system according to any one of claims 1 to 4, wherein said transmitter transmits said PSK information symbols in a predetermined frequency slot in said transmission frame continuously in time.

6. The system according to any one of claims 1 to 4, wherein said transmitter differentially codes said PSK information symbols with said reference symbols used as the basis of differential coding.

7. For use with an orthogonal frequency division multiplexing transmission system for radio transmission of information from a transmitter to a receiver using orthogonal frequency division multiplexing modulation, said transmitter comprising:

multiplexing means for multiplexing reference symbols, PSK information symbols subjected to at least PSK modulation, and information symbols subjected to digital modulation with a higher multi-value level than said PSK modulation by configuring a transmission frame such that a plurality of slots are two-dimensionally arranged along time and frequency axes, said reference symbols are inserted into predetermined simultaneous slots in said transmission frame, and said PSK information symbols and said information symbols are inserted into the other slots of said transmission frame in a predetermined positional relation with respect to each other;

orthogonal frequency division multiplexing modulation means for orthogonal frequency division multiplexing modulating said transmission frame configured by said multiplexing means; and transmitting means for orthogonal modulating output signals of said orthogonal frequency division multiplexing modulation means for transmission.

8. The transmitter according to claim 7, wherein between said multiplexing means and said orthogonal frequency division multiplexing modulation means is provided differential coding means for differentially coding said PSK information symbols in said transmission frame configured by said multiplexing means.

9. For use with an orthogonal frequency division multiplexing transmission system for radio transmission of information from a transmitter to a receiver by orthogonal frequency division multiplexing modulation using multiple carriers, said receiver comprising:

receiving means for receiving and quadrature demodulating an orthogonal frequency division multiplexing modulated signal to recover an orthogonal demodulated signal, said orthogonal frequency division multiplexing modulated signal including a transmission frame in which a plurality of slots are two-dimensionally arranged along time and frequency axes, reference symbols are inserted into predetermined restricted slots, and PSK information symbols subjected to at least PSK modulation and information symbols subjected to digital modulation with a higher multi-value level than said PSK modulation are inserted into the other slots in a predetermined positional relation with respect to each other;

orthogonal frequency division multiplexing demodulation means for orthogonal frequency division multiplexing demodulating said quadrature demodulated signal from said receiving means to obtain a demodulated signal;

equalizing means for equalizing the amplitude and phase of each symbol in said demodulated signal from said orthogonal frequency division multiplexing demodulation means;

error detecting means for detecting amplitude errors and phase errors of said multiple carriers from said reference symbols in said demodulated signal output from said orthogonal frequency division multiplexing demodulation means;

variation detecting means for detecting variations in amplitude and phase of a received signal from said PSK information symbols in said demodulated signal equalized by said equalizing means; and correcting information producing means for producing correcting information from said amplitude errors and phase errors of said multiple carriers detected by said error detecting means and said variations in amplitude and phase of said received signal detected by said variation detecting means, wherein said equalizing means is responsive to said correcting information from said correcting information producing means to correct the amplitude and phase of said symbols in said demodulated signal output from said orthogonal frequency division multiplexing demodulation means.

10. The receiver according to claim 9, wherein said variation detecting means includes amplitude and phase variation detecting means for detecting variations in amplitude and phase of a received signal from said PSK information symbols in said demodulated signal output from said equalizing means, and interpolation means for seeking variations in amplitude and phase for information symbols other than said PSK information symbols by interpolation on the basis of outputs of said amplitude and phase variation detecting means.

11. The receiver according to any one of claims 9 and 10, further comprising frequency control means for averaging phase variations detected by said variation detecting means to produce a frequency control signal and supplying it to quadrature demodulation means of said receiving means to thereby control the frequency of a regenerative carrier.

12. For use with a transmission system for orthogonal frequency division multiplexing modulating a transmission frame in which a plurality of reference symbols are inserted into predetermined simultaneous slots, a plurality of PSK information symbols are inserted intermittently into an information symbol inserted region and said PSK information symbols are subjected to differential coding for radio transmission from a transmitter to a receiver, said receiver comprising:

receiving means for receiving and quadrature demodulating an orthogonal frequency division multiplexing modulated signal, said orthogonal frequency division multiplexing modulated signal including said transmission frame;

orthogonal frequency division multiplexing demodulation means for quadrature frequency division multiplexing demodulating said orthogonal demodulated signal from said receiving means; and differential decoding means for demodulating PSK symbols in said demodulated signal from said orthogonal frequency division multiplexing demodulation means by using a current symbol and a preceding symbol.

13. The receiver according to claim 12, further comprising frequency variation detecting means for detecting variations in frequency of a received signal from said PSK information symbols demodulated by said differential decoding means, and frequency control means for averaging frequency variations detected by said frequency variation detecting means to produce a frequency control signal and supplying it to quadrature demodulation means of said receiving means to control the frequency of a regenerative carrier.

* * * * *